(12) United States Patent
Greene et al.

(10) Patent No.: US 11,166,126 B2
(45) Date of Patent: Nov. 2, 2021

(54) SYSTEM, APPARATUS, AND COMPUTER PROGRAM PRODUCT FOR GENERATING A GROUP-BASED COMMUNICATION INTERFACE HAVING IMPROVED PANES POSITIONED IN A DEFINED DISPLAY WINDOW

(71) Applicant: Slack Technologies, Inc., San Francisco, CA (US)

(72) Inventors: Isaiah Greene, New York, NY (US); Jerry Talton, New York, NY (US); Noah Weiss, New York, NY (US); Michael Montazeri, New York, NY (US); Luis Tandalla, New York, NY (US); Anna Niess, New York, NY (US); Renaud Bourassa-Denis, New York, NY (US); Kyle Stetz, San Francisco, CA (US)

(73) Assignee: Slack Technologies, Inc., San Francisco, CA (US)

( * ) Notice: Subject to any disclaimer, the term of this patent is extended or adjusted under 35 U.S.C. 154(b) by 228 days.

(21) Appl. No.: 15/853,376

(22) Filed: Dec. 22, 2017

(65) Prior Publication Data

US 2019/0200177 A1 Jun. 27, 2019

(51) Int. Cl.
- *H04W 4/12* (2009.01)
- *G06Q 10/06* (2012.01)
- *H04L 12/58* (2006.01)
- *H04L 29/08* (2006.01)

(52) U.S. Cl.
CPC ............. *H04W 4/12* (2013.01); *G06Q 10/06* (2013.01); *H04L 51/16* (2013.01); *H04L 67/10* (2013.01)

(58) Field of Classification Search
CPC .......... H04W 4/12; H04W 4/14; H04L 51/18; H04L 51/16
See application file for complete search history.

(56) References Cited

U.S. PATENT DOCUMENTS

| | | | |
|---|---|---|---|
| 9,489,081 B2 * | 11/2016 | Anzures | H04L 51/10 |
| 2007/0203991 A1 * | 8/2007 | Fisher | G06Q 10/107 709/206 |
| 2013/0212047 A1 * | 8/2013 | Lai | G06Q 10/107 706/12 |
| 2014/0245178 A1 * | 8/2014 | Smith | H04L 51/16 715/753 |
| 2016/0227387 A1 * | 8/2016 | Chiu | H04L 51/38 |
| 2018/0234810 A1 * | 8/2018 | Jayaram | H04W 4/14 |

(Continued)

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

(Continued)

*Primary Examiner* — Esther B. Henderson
(74) *Attorney, Agent, or Firm* — Lee & Hayes, P.C.

(57) ABSTRACT

This disclosure is directed to a group-based communication system that is configured to generate a group-based communication interface comprising a priority pane, a last actions pane, and a missed pane. Each of the priority pane, the last actions pane, and the missed pane and configured for efficient positioning within a defined display window of a client device.

22 Claims, 8 Drawing Sheets

(56) References Cited

U.S. PATENT DOCUMENTS

2018/0278563 A1* 9/2018 Frost .................. H04L 51/32
2018/0287982 A1 10/2018 Draeger et al.

OTHER PUBLICATIONS

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Internet Relay Chat, Wikipedia, , [online][retrieved May 30, 2019]. Retrieved from the Internet: <URL: https://en.wikipedia.org/wiki/Internet_Relay_Chat>. (dated May 28, 2019) 17 pages.
Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.
"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
Matsumoto, T. et al., "Chocoa Communicator—A New Communication System Based on Awareness and Text Communications—", Fujitsu Sci. Tech. J., 36, 2, (Dec. 2000) 154-161.

* cited by examiner

406

| 408<br>Global ID | 410<br>Full Name Value | 412<br>Preferred Name Value | 414<br>Group ID/Sub-Group ID |
|---|---|---|---|
| W12345678 | Mary James | Mary | 004/Security |
|  |  |  | 004/Mobile |
| W22222222 | Walter White | Walt | 004/Mobile |
| W33333333 | David Le | Dave | 004/Domestic Sales |
| W44444444 | 山田　太郎 | 太郎ちゃん | 004/Int. Mobile |
|  |  | Taro-chan |  |
|  | Taro Yamada | Tar |  |

SYSTEM, APPARATUS, AND COMPUTER PROGRAM PRODUCT FOR GENERATING A GROUP-BASED COMMUNICATION INTERFACE HAVING IMPROVED PANES POSITIONED IN A DEFINED DISPLAY WINDOW

BACKGROUND

An enterprise may support communication and collaboration among users across the enterprise. Applicant has identified a number of deficiencies and problems associated with collaborative communication environments. Through applied effort, ingenuity, and innovation, many of these identified problems have been solved by developing solutions that are included in embodiments of the present disclosure, many examples of which are described in detail herein.

BRIEF SUMMARY

This disclosure relates to a group-based communication server configured to generate a renderable priority object, the renderable priority object comprising an unread direct message set with a global identifier, and an unread message communication set associated with a group-based communication channel identifier. The group-based communication server is further configured to output the renderable priority object to a client device for rendering as a priority pane of a group-based communication interface within a defined display window.

In another embodiment, the group-based communication server is further configured to retrieve, from a group-based communication repository, unread direct messages associated with the global identifier, retrieve, a timestamp for each of the unread direct messages, and determine the unread direct message set based on the retrieved unread direct messages and their corresponding timestamps.

In another embodiment, the group-based communication server is further configured to retrieve, from a group-based communication repository, unread message communications associated with the group-based communication channel identifier, retrieve, a timestamp for each of the unread message communications, and determine the unread message communication set based on the retrieved unread message communications their corresponding timestamps.

In one embodiment, the unread direct message set comprises no more than 5 unread direct messages.

In one embodiment, the unread message communication set comprises no more than 5 unread message communications.

In another embodiment, the group-based communication server is further configured to access an urgent indicator field for each of the unread direct messages, and determine the unread direct message set based on the contents of the accessed urgent indicator fields.

In another embodiment, the group-based communication server is further configured to determine an unread direct message score for each unread direct message in the unread direct message set, and determine a display order of one or more unread direct messages in the unread direct message set based on one or more unread direct message score.

In another embodiment, the group-based communication server is further configured to determine, an unread message communication score for each unread message communication in the unread message communication set, and determine a display order of one or more unread message communications in the unread message communication set based on one or more unread direct message score.

In another embodiment, the group-based communication server is further configured to generate a renderable last actions object, the last actions object comprising a sent message communication set associated with the global identifier. The group-based communication server is further configured to output the renderable last actions object to the client device for rendering as a last actions pane of the group-based communication interface within the defined display window.

In another embodiment, the group-based communication server is further configured to retrieve, from a group-based communication repository, sent message communications associated with the global identifier, retrieve, a timestamp for each of the sent message communications and determine the sent message communication set based on the retrieved sent message communications and their corresponding timestamps.

In one embodiment the sent message communication set comprises no more than 5 sent message communications.

In another embodiment, the group-based communication server is further configured to determine a sent message communication score for each sent message communication in the sent messaging set, and determine a display order of one or more sent message communications in the sent message communication set based on one or more sent message communication score.

In another embodiment, the group-based communication server is further configured to configure the renderable priority object and the renderable last actions object to be renderable simultaneously within the defined display window.

In another embodiment, the group-based communication server is further configured to generate a renderable missed object, the renderable missed object comprising a second unread message communication set associated with a group-based communication channel identifier. The group-based communication server is further configured to output the renderable missed object to the client device for rendering as a missed pane of the group-based communication interface within the defined display window.

In another embodiment, the group-based communication server is further configured to retrieve, from a group-based communication repository, a group-based communication channel access count for each group-based communication channel associated with the global identifier, wherein the group-based communication channel access count indicates the frequency that the client device accesses each group-based communication channel associated with the global identifier.

In another embodiment, the group-based communication server is further configured to determine an missed message communication score for each unread message communication in second unread message communication set, and determine a display order of one or more unread message communications in the second unread message communication set based on one or more missed message communication scores.

In another embodiment, the group-based communication server is further configured to configure the renderable priority object and the renderable missed object to be renderable simultaneously within the defined display window.

DETAILED DESCRIPTION OF VARIOUS EMBODIMENTS

Figure 1:
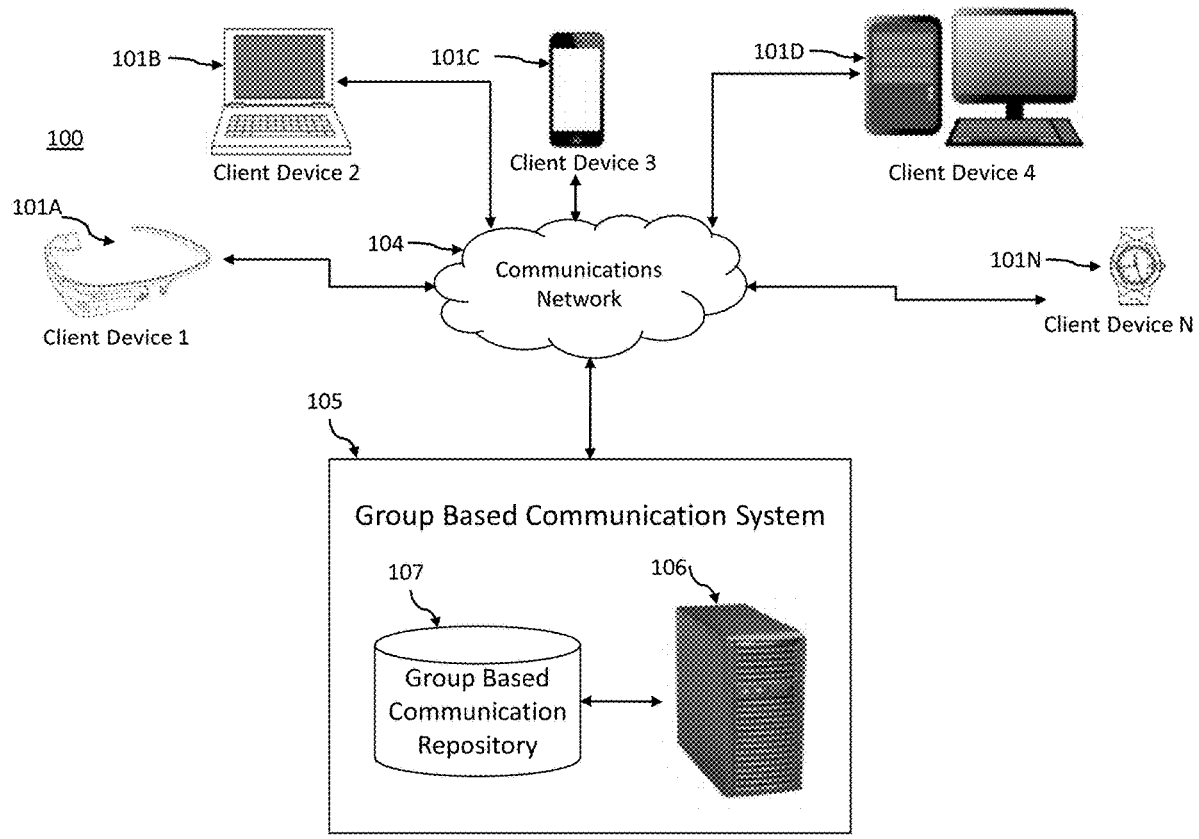
FIG. 1 illustrates an exemplary group-based communication system within which embodiments of the present disclosure may operate.

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

This disclosure describes a system for determining relevant direct messages and message communications within a group-based communication system. Currently there are many different ways for people to collaborate and communication such as email, text messaging and social media. Within any of these collaborative environments, a user may receive several messages daily and often will not have time to read them all. The system presented in this disclosure helps simplify mass messaging within collaborative environments and provides a user of a client device a simple graphical user interface to summarize all of his relevant communications within a collaborative environment.

There are several technical issues with current collaborative systems. For example, current collaborative systems are not configured to present a user of a client device with a graphical user interface containing messages of high priority in combination with a user's last actions within the collaborative environment and in further combination with highly relevant missed messages within the collaborative environment. Current collaborative systems may use a basic importance indicator to determine high priority messages within a collaborative environment. However, in a complex collaborative environment (as presented in this disclosure) where a user is a member of multiple group-based communication channels that contain message communications and where the user can also receive direct messages directly from other users of the group-based communication system a simple importance indicator attached to a direct message or message communication cannot reasonably show which messages are a high priority to a user. Similarly, current collaborative systems do not provide a technical solution for determining which unread messages are most important to a user. This is especially true when the user is in a complex collaborative environment that comprises several group-based communication channels. Current collaborative systems, may simply use a time indicator present a user with his most recent unread messages. However, in a complex collaborative environment the most recent messages may not be the most relevant messages to a user. This disclosure improves the functionality of complex collaborative communication systems by utilizing one or more methods and apparatus to determine and present to a client device direct messages and message communications that are high priority and also unread message communications that are highly relevant to a user. This closure customizes what is high priority and what is highly relevant on a user by user basis. This disclosure simplifies the vast amount of information in a complex collaborative system.

Terms

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "user" should be understood to refer to an individual, group of individuals, business, organization, and the like. The users referred to herein access a group-based communication or messaging system using client devices.

The term "client device" refers to computer hardware and/or software that is configured to access a group-based communication system made available by a group-based communication server. The group-based communication server is often (but not always) on another computer system, in which case the client device accesses the group-based communication system by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Each such interface being accessible of distinct groups of users (e.g., Slack employees and ACME employees, respectively, in the enterprise context). Example group-based communication systems comprise supporting servers, client devices, and external applications.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below.

As used herein, the terms "group-based communication channel" and "channel" refer to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) may be displayed to each member of the group-based communication channel. For instance, in one embodiment, a common set of group-based messaging communications will be displayed to each member of the respective group-based communication channel such that the content of the group-based communication channel (i.e., messaging communications) will not vary per member of the channel. However, in another embodiment, a member may join a group-based communication channel and only be able to view subsequent group-based messaging communications (as opposed to historical group-based messaging communications). The group-based communication channels are generally topic-oriented, long-lasting channels as opposed to ad hoc ephemeral conversations in conventional messaging apps.

The terms "user profile," "user account," and "user account details" refer to information associated with a user, including, for example, a user identifier, a global identifier, one or more group-based communication channel identifiers associated with group-based communication channels that the user has been granted access to, group-based communication channel access counts for keeping track of the frequency with which a client device associated with the user profile accesses a group-based communication channel that is associated with a stored group-based communication channel identifier, one or more group identifiers for groups with which the user is associated, one or more sub-group identifiers for teams within groups with which the user is associated, an indication as to whether the user is an owner of any group-based communication channels, an indication as to whether the user has any group-based communication channel restrictions, a plurality of message communications, a plurality of emojis, a plurality of conversations, a plurality of conversation topics, an avatar, an email address, a real name (e.g., John Doe), a username (e.g., jdoe), a password, a real name, a time zone, job, a user status value, user interest indicators, and the like. The user account details can include a subset designation of user credentials, such as, for example, login information for the user including the user's username and password.

The term "user interest indicators" refers to one or more items of data that indicate user-associated trends or user behavior, or which may be modeled by a group-based communication system to predict or suggest future user behavior within a group-based communication interface. User interest indicators include all signals of engagement by a user with a group-based communication interface including, without limitation, message communications and message communication information, user profile associated information, direct messages and direct message information, client device reported location data, mouse-over data, click data, channel engagement data, and the like. Such interest indicators could include a popular discussion topics indicator that indicates popular discussion topics in a user's message communications or direct messages, a user's group-based communication channel access counts, group-based communication channel member discussion frequency indicator that indicates the frequency by which the user interacts with the members of a group-based communication channel, a popular direct message recipients indicator that indicates users that the user most frequently sends a direct message to, a user status value (e.g., a user's role or status within an organization), a user's preferred contacts indicator that indicates preferred users (i.e., wife, kids, parents related to the user or other individuals that the user has indicated as preferred), and a user application interaction indicator that indicates a user's interaction with applications installed in one or more group-based communication channels. User interest indicators may also be determined from aggregated data of other users, perhaps deemed similar to a user of interest (e.g., similar role within a group or enterprise, similar age, gender, etc.), stored to the group-based communication repository. Based on these user interest indicators a group-based communication server may determine direct messages, unread direct messages, message communications, unread message communications, sent message communications and the like that are relevant or of particular interest to a user.

The term "global identifier" refers to one or more items of data by which a user may be uniquely identified across an organization and the group-based communication system. In embodiments, where the group-based communication system spans multiple organizations the global identifier is unique across multiple organizations. In one embodiment, the global identifier is a 64 bit unsigned integer or a base34 encoded string that uniquely identifies a user.

The terms "group-based communication channel identifier" or "channel identifier" refer to one or more items of data by which a group-based communication channel may be identified. For example, a group-based communication channel identifier may comprise ASCII text, a pointer, a memory address, and the like.

The term "group identifier" refers to one or more items of data by which a group that is defined within a group-based communication system may be identified. For example, a group identifier may comprise ASCII text, a pointer, a memory address, and the like. Group identifiers may be used by the group-based communication system to generate respective group-based communication interfaces. For example, a group identifier may be used by the group-based communication system to indicate that a group-based communication interface of Slack Corporation is to be rendered rather than the group-based communication interface of ACME Corporation. One or more sub-group identifiers may be associated with group identifiers as discussed in greater detail below.

As used herein, the terms "message communication," "group-based message communication," "communication message," "messaging communication" and "message" refers to any electronically generated digital messaging object provided by a user using a client device and that is configured for display within a group-based communication channel. Message communications may include any text (including a resource request), image, video, audio or combination thereof provided by a user (using a client device). For instance, a user may provide a message communication that includes text as well as an image and a video. In such a case, the text, image, and video would comprise the digital messaging object that is sent from the client device and eventually rendered, as a message communication, within a group-based communication channel. Each digital messaging object supported by the group-based communication system includes metadata comprising the following: a sending user identifier, a group-based message identifier, group-based message contents, a group identifier, a sub-group identifier, and a group-based communication channel identifier. The preceding metadata is referred to as message communication information, which is defined in greater detail below. Each of the foregoing identifiers may comprise ASCII text, a pointer, a memory address, and the like. Instances of metadata may comprise ASCII text, a pointer, a memory address, and the like.

A "direct message" refer to an electronically generated digital content object provided by a user using a client device that is configured for display outside of a group-based communication channel. A direct message may include any text, image, video, audio, or combination thereof provided by a user (using a client device). For instance, the user may provide a direct message that includes text as well as an image and a video within the direct message as message contents. In such a case, the text, image, and video would comprise the direct message or digital content object. Each direct message may include associated metadata such as a sending user identifier, recipient identifier, a message identifier, an urgent indicator field, a timestamp, and the like. The preceding metadata is referred to as direct message information, which is defined in greater detail below. Each of the foregoing instances of metadata may comprise ASCII text, a pointer, a memory address, and the like. Direct messages are user based such that each direct message may include one or more global identifiers (i.e. recipient identifier) that indicates which users may view and respond to the direct message.

Thread communication messages are communications received in threads. Otherwise, group-based message communications are generally initiated in channels. A "thread" is a collection of message communications displayed to a subsidiary feed arising from or otherwise associated with a selected group-based message communication displayed in a selected group-based communication channel. A thread may include one or more "threaded messages" or "thread communication messages" that are linked together in the subsidiary feed, wherein each is associated with the selected group-based message communication.

A "new message communication" or "unread message communication" refers to a message communication that has been received by a group-based communication server, but has not yet been selected or engaged by a user via a group-based communication interface of a client device. An unread message communication may include metadata such as a sending user identifier, a message identifier, a group identifier, a sub-group identifier, a group-based communication channel identifier, an urgent indicator field, a timestamp, an unread message flag, and the like. Such metadata may be referred to as message communication information. Unread message communications may be distinguished from read message communications by the state of the unread message flag (e.g., a binary zero or one, a hexadecimal value, etc.).

A "new direct message" or "unread direct message" refers to a direct message that has been received by a group-based communication server, but has not yet been selected or engaged by a user via a group-based communication interface of a client device. An unread direct message may include metadata such as a sending user identifier, a message identifier, a global identifier, an urgent indicator field, a timestamp, an unread message flag, and the like. Such metadata may be referred to as direct message information. Unread direct messages may be distinguished from read direct messages by the state of the unread message flag (e.g., a binary zero or one, a hexadecimal value, etc.).

An "incomplete message communications" or "draft message communications" refers to a message communication that has been initiated on a client device but has not yet been transmitted to its intended recipient. For example, a user, via a client device, may create a message communication and a group-based communication server may store that message communication and not transmit the message communication to a memory location associated with the intended group-based communication channel thus creating an incomplete message communication that is not viewable by members of the intended group-based communication channel. An incomplete message communication may include metadata such as a sending user identifier, a message identifier, an urgent indicator field, a timestamp, group-based communication channel identifier (i.e., recipient identifier), and the like. Such metadata may be referred to as message communication information.

An "incomplete direct message" or "draft direct message" refers to a direct message that has be initiated on a client device but has not yet been transmitted to its intended recipient. For example, a user, via a client device, may create a direct message and a group-based communication server may store that direct message and not transmit the direct message to a memory location associated with the intended recipient thus creating an incomplete direct message that is not viewable by intended recipients of the group-based communication channel. An incomplete direct message may include metadata such as a sending user identifier, a message identifier, an urgent indicator field, a timestamp, group-based communication channel identifier (i.e., recipient identifier), and the like. Such metadata may be referred to as direct message information.

A "sent message communication" refers to a message communication that has been sent by a client device related to a user and received by the intended recipient or a memory location associated with the intended recipient. A sent message communication may also have include metadata such as a sending user identifier, a message identifier, a group identifier, a sub-group identifier, a group-based communication channel identifier (recipient identifier), an urgent indicator field, a timestamp, and the like. Such metadata may be referred to as message communication information.

A "sent direct message" refers to a message communication that has been sent by a client device related to a user and received by the intended recipient or a memory location associated with the intended recipient. A sent direct message may include metadata such as a sending user identifier, a message identifier, a recipient identifier, an urgent indicator field, a timestamp, and the like. Such metadata may be referred to as direct message information.

The term "unread direct message score" refers to the output of ranking model or algorithm such as a co-ranking model, a statistical model, a machine learning model, a trainable classifier, a supervised learning model, and the like, which indicates the relevance of an unread direct message to a user based on attributes of the unread direct message (e.g., metadata, urgent message indicator, timing, etc.) and attributes of the user (i.e., user profile associated data, client device location, etc.). In one embodiment, the unread direct message score is used to determine the display order of one or more unread direct messages within a group-based communication interface.

The term "unread message communication score" refers to the output of ranking model or algorithm such as a co-ranking model, a statistical model, a machine learning model, a trainable classifier, a supervised learning model, and the like, which indicates the relevance of an unread message communication to a user based on attributes of the unread message communication (e.g., metadata, urgent message indicator, timing, etc.) and attributes of the user (i.e., user profile associated data, client device location, etc.). In one embodiment, the unread message communication score is used to determine the display order of one or more unread message communications within a group-based communication interface.

The term "sent message communication score" refers to the output of ranking model or algorithm such as a co-ranking model, a statistical model, a machine learning model, a trainable classifier, a supervised learning model, and the like, which indicates the relevance of a sent message communication to a user based on attributes of the sent message communication (e.g., metadata, urgent message indicator, timing, etc.) and attributes of the user (i.e., user profile associated data, client device location, etc.). In one embodiment, the sent message communication score is used to determine the display order of one or more sent message communications within a group-based communication interface.

The term "sent direct message score" refers to the output of ranking model or algorithm such as a co-ranking model, a statistical model, a machine learning model, a trainable classifier, a supervised learning model, and the like, which indicates the relevance of a sent direct message to a user based on attributes of the sent direct message (e.g., metadata, urgent message indicator, timing, etc.) and attributes of the user (i.e., user profile associated data, client device location, etc.). In one embodiment, the sent direct message score is used to determine the display order of one or more sent direct messages within a group-based communication interface.

The term "missed message communication score" refers to the output of ranking model or algorithm such as a co-ranking model, a statistical model, a machine learning model, a trainable classifier, a supervised learning model, and the like, which indicates the relevance of an unread message communication to a user based on attributes of the unread message communication (e.g., metadata, urgent message indicator, timing, group-based communication channel identifier, etc.), attributes of the user (i.e., user profile associated data, client device location), and attributes of the one or more group-based communication channels the user belongs to (i.e., frequency of message communications, last sent message communication timestamp, etc.). In one embodiment, the missed message communication score is used to determine the display order of one or more missed message communications within a group-based communication interface.

The term "urgent indicator field" refers to a metadata field associated with a message communication that indicates to a group-based communication server a level of urgency of the associated message communication. In one embodiment, the urgent indicator field may be represented as a binary flag. In another embodiment, the urgent indicator field may be a value between 1 and 10, wherein 1 is a non-urgent message communication and 10 is the highest level of urgency for a message communication.

The term "sent message communication set" refers to a set of sent message communications or identifiers related to a set of sent message communications.

The term "sent direct message set" refers to a set of sent direct messages or identifiers related to a set of sent direct messages.

The term "unread direct message set" refers to a set of unread direct messages or identifiers related to a set of unread direct messages.

The term "unread message communication set" refers to a set of unread message communications or identifiers related to a set of unread message communications.

As used herein, "defined display window" is a defined area in the selected group-based communication interface where information is displayed.

A "channel list pane" is a display pane configured to display lists of group-based communication channels and indicate when new message communications are received in a respective group-based communication channels. In one embodiment, a group-based communication server may identify one or more group-based communication channel identifiers associated with a user of a client device and generate a renderable channel list object for a client device that when rendered by the client device produces the channel list pane. The channel list pane may include actuators (e.g., hyperlinks, widgets, etc.) for initiating requests to view selected group-based communication channels. The channel list pane may include additional information, such as message communication information, notifications, the name of the group, name of the particular member viewing the interface, etc.

A "direct messaging pane" is a display pane configured to display a list of user identifiers associated with users who have sent (via respective client devices) direct messages to a client device associated with a user. The direct messaging pane may also indicate when new direct messages are received. In one embodiment, a group-based communication server may identify one or more global identifiers associated with received direct messages and generate a renderable direct messaging object for a client device that when rendered by the client device produces the direct messaging pane. The direct messaging pane may display a user identifier associated with a global identifier instead of the global identifier itself. The direct messaging pane may include actuators (e.g., hyperlinks, widgets, etc.) for initiating requests to view selected direct message. The direct messaging pane may include additional information, such as message communication information, notifications, name of the particular member viewing the interface, etc.

A "priority pane" is a display pane configured to display one or more unread message communications and/or one or more unread direct messages. In one embodiment, the priority pane may include message communications or direct messages indicated as urgent via an urgent field indicator. In one embodiment, a group-based communication server may identify, in-part by accessing a user's profile data and a group-based communication repository, one or more unread message communications and/or one or more direct messages related to a user of a client device and generate a renderable priority object that when rendered by the client device produces the priority pane. The priority pane may include actuators (e.g., hyperlinks, widgets, etc.) for initiating requests to view selected unread message communications. The priority pane may include additional information, such as message communication information, notifications, name of the particular member viewing the interface, etc.

A "last actions pane" is a display pane configured to display one or more sent message communications, one or more incomplete message communications, one or more recently accessed files, recent group-based communication channel history, and the like. In one embodiment, a group-based communication server may identify, in-part by referencing the global identifier of a user, one or more sent message communications transmitted by a client device associated with that global identifier and generate a renderable last actions object that when rendered by the client device generates the last actions pane with the group-based communication interface. Similarly, a group-based communication server may identify, in-part by referencing the global identifier of a user, one or more incomplete message communications started by a client device associated with that global identifier and generate the renderable last actions object. The last actions pane may include actuators (e.g., hyperlinks, widgets, etc.) for initiating requests to view selected sent message communications, incomplete message communications, recent group-based communication channel history, and/or recently accessed files. The last actions pane may include additional information, such as message communication information, notifications, name of the particular member viewing the interface, etc.

A "missed pane" is a display pane configured to display one or more unread message communications. The displayed one or more unread message communications may be based on a missed message communication score. In one embodiment, a group-based communication server may identify, in-part by referencing a user profile, one or more group-based communication channels a user belongs to, how many times a client device associated with that user has accessed each group-based communication channel, unread message communications within each group-based communication channel, and generate a renderable missed object that when rendered by the client device produces the missed pane within the group-based communication interface. The missed pane may include actuators (e.g., hyperlinks, widgets, etc.) for initiating requests to view selected unread message communications. The missed pane may include additional information, such as message communication information, notifications, name of the particular member viewing the group-based communication interface, etc.

As used herein, "message communication information" refers to any information associated with a message communication, such as a sending user identifier indicating the user who created the message communication; an unread message flag; group-based communication channel identifier indicating an associated group-based communication channel; the time and date (i.e., a timestamp) that the message communication was first provided to a group-based communication server; an urgent indicator; a has_file indicator that indicates whether a message communication contains a file or not; a word count indicator that indicates the number of words contained in the message communication; a message topic indicator that indicates the topic of the message communication stemming from the message communication (e.g., date and time the channel was made or last received a message communication, etc.), and any other identifying information related to the message communication.

As used herein "direct message information" refers to any information associated with a direct message, such as a sending user identifier indicating a global identifier of the user who created the direct message; a recipient identifier indicating the global identifier(s) of one or more recipients of the direct message; the time and date (i.e. a timestamp) that the direct message was first provided to a group-based communication server; an urgent indicator; an unread message flag; a has_file indicator that indicates whether a direct message contains a file or not; a word count indicator that indicates the number of words contained in the direct message; and any other identifying information related to the message communication.

As used herein, "request" refers to an instruction or direction, generally initiated by a user, via a client device, for an action to taken by a group-based communication server. For instance, a user may request, via a client device, to view a specific group-based communication channel (e.g., selected channel view request), create a channel (e.g., channel request), view a selected channel (e.g., selected channel view request), view a summary of channels the user follows (e.g., channel summary view request), view profile data of another user, view certain message communication information, share a select channel communication message from a channel to the selected group-based communication channel from which the channel was created (e.g., share request), receive notifications regarding a channel (e.g., follow request), notify a selected member of a channel communication message (e.g., follow request), etc.

The terms "sending user identifier" and "originator identifier" refer to one or more items of data by which the originator of a direct message or message communication may be identified. The originator identification may be an email address, user identifier, global identifier, full name value, display name value, group identifier, a sub-group identifier, an IP address, or any other type of information that can identify a requesting entity.

Group-based users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

Example System Architecture

Methods, apparatuses, and computer program products of the present disclosure may be embodied by any of a variety of devices. For example, the method, apparatus, and computer program product of an example embodiment may be embodied by a networked device (e.g., an), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone network, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as known in the art. The group-based communication server 106 operates as a security apparatus for the group-based communication system 105. The group-based communication server 106 may is configured to receive of electronic data from various sources, including but not necessarily limited to the client devices 101A-101N. For example, the group-based communication server 106 may be operable to receive message communications and direct messages from client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of message communications organized among a plurality of group-based communication channels, and direct messages.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute applications ("apps") to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message communication and corresponding message communication information may be sent from a client device 101A-101N to a group-based communication server 106. In various implementations, the message communication and the corresponding message communication information may be sent to the group-based communication server 106 over communications network 104 directly by a client device 101A-101N, the message communication may be sent to the group-based communication system 105 via an intermediary such as the group-based communication server 106. For example, the client device 101A-101N may be a desktop, a laptop, a tablet, a smartphone, and/or the like that is executing a client application (e.g., a group-based communication app). In one implementation, the message communication information may include data such as a message identifier, sending user identifier, a group identifier, a group-based communication channel identifier, message contents (e.g., text, emojis, images, links), attachments (e.g., files), message hierarchy data (e.g., the message communication may be a reply to another message communication), third party metadata, and/or the like. In one embodiment, the client device 101A-101N may provide the following example message communication, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
            <client_IP>10.0.0.123</client_IP>
            <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>app with webkit</client_app_type>
            <app_installed_flag>true</app_installed_flag>
            <app_name>.app</app_name>
            <app_version>1.0 </app_version>
            <app_webkit_name>Mobile Safari</client_webkit_name>
            <client_version>537.51.2</client_version>
    </client_details>
    <client_details> //iOS Client with Webbrowser
            <client_IP>10.0.0.123</client_IP>
            <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1 </client_OS_version>
            <client_app_type>web browser</client_app_type>
            <client_name>Mobile Safari</client_name>
            <client_version>9537.53</client_version>
    </client_details>
    <client_details> //Android Client with Webbrowser
            <client_IP>10.0.0.123</client_IP>
            <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-
XXXXXXXXXXXXX</client_UDID>
            <client_OS>Android</client_OS>
            <client_OS_version>4.0.4</client_OS_version>
            <client_app_type>web browser</client_app_type>
```

-continued

```
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting disclosure. I have attached a copy our patent
policy.</contents>
        <attachments>patent_policy.pdf</attachments>
    </message>
</auth_request>
```

The group-based communication system 105 comprises at least one group-based communication server 106 that may create a storage message based upon the received message communication to facilitate message indexing and storage in a group-based communication repository 107. In one implementation, the storage message may include message communication information such as a message identifier, a group identifier, a group-based communication channel identifier, a sending user identifier, topics, responses, attachments, message hierarchy data, third party metadata, conversation primitive data, and/or the like. For example, the group-based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting disclosure. I have attached a copy
our patent
policy.</contents>
    <attachments>patent_policy.pdf</attachments>
    <conversation_primitive>
        conversation includes messages: ID_message_8,
        ID_message_9,
```

-continued

```
        ID_message_10,
            ID_message_11, ID_message_12
    </conversation_primitive>
</storage_message>
```

In embodiments, a group identifier as defined above may be associated with the message.

In embodiments, a group-based communication channel identifier as defined above may be associated with the message communication.

In embodiments, a sending user identifier as defined above may be associated with the message communication. In one implementation, the message communication may be parsed (e.g., using PHP commands) to determine a sending user identifier of the user who sent the message communication.

In embodiments, topics may be associated with the message communication. In one implementation, the message contents may be parsed (e.g., using PHP commands) to determine topics discussed in the message communication. For example, hashtags in the message communication may indicate topics associated with the message communication. In another example, the message communication may be analyzed (e.g., by itself, with other message communications in a conversation primitive) or parsed using a machine learning technique, such as topic modeling, to determine topics associated with the message communication.

In embodiments, data indicating responses may be associated with the message communication. For example, responses to the message communication by other users may include reactions (e.g., selection of an emoji associated with the message communication, selection of a "like" button associated with the message communication), clicking on a hyperlink embedded in the message communication, replying to the message communication (e.g., posting a message to the group-based communication channel in response to the message communication), downloading a file associated with the message communication, sharing the message from one group-based communication channel to another group-based communication channel, pinning the message communication, starring the message communication, and/or the like. In one implementation, data regarding responses to the message communication by other users may be included with the message communication, and the message communication may be parsed (e.g., using PHP commands) to determine the responses. In another implementation, data regarding responses to the message communication and other types of message communication information may be retrieved from a database. For example, message communication information may be retrieved via a MySQL database command similar to the following:

```
SELECT messageResponses
FROM MSM_Message
WHERE messageID = ID_message_10.
```

For example, data regarding responses to the message may be used to determine context for the message communication (e.g., a social score for the message from the perspective of some user). In another example, data regarding responses to the message communication may be analyzed to determine context regarding the user (e.g., the user's expertise in a topic may be determined based on the responses to the user's message communication regarding the topic).

In embodiments, attachments may be included with the message communication. If there are attachments, files may be associated with the message communication. In one implementation, the message communication may be parsed (e.g., using PHP commands) to determine file names of the attachments. For example, file contents may be analyzed to determine context for the message communication (e.g., a patent policy document may indicate that the message communication is associated with the topic "patents").

In embodiments, third party metadata may be associated with the message communication. For example, third party metadata may provide additional context regarding the message communication or the user that is specific to a company, group, group-based communication channel, and/or the like. In one implementation, the message communication may be parsed (e.g., using PHP commands) to determine third party metadata. For example, third party metadata may indicate whether the user who sent the message communication is an authorized representative of the group-based communication channel (e.g., an authorized representative may be authorized by the company to respond to questions in the group-based communication channel.)

In embodiments, a conversation primitive may be associated with the message communication. In one implementation, a conversation primitive is an element used to analyze, index, store, and/or the like message communications. For example, the message communication may be analyzed by itself, and may form its own conversation primitive. In another example, the message may be analyzed along with other message communications that make up a conversation, and the message communications that make up the conversation may form a conversation primitive. In one implementation, the conversation primitive may be determined as the message communication, a specified number (e.g., two) of preceding message communications and a specified number (e.g., two) of following message communications. In another implementation, the conversation primitive may be determined based on analysis of topics discussed in the message communication and other message communications (e.g., in the group-based communication channel) and/or proximity (e.g., message send order proximity, message send time proximity) of these message communications.

In embodiments, various metadata, which is part of message communication information, is determined as described above, and/or the contents of the message communication may be used to index the message communication (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, message communication information associated with the message communication may be determined and the message communication may be indexed in group-based communication repository 107. In one embodiment, the message communication may be indexed such that a company's or a group's message communications are indexed separately (e.g., in a separate index associated with the group and/or company that is not shared with other groups and/or companies). In one implementation, message communications may be indexed at a separate distributed repository (e.g., to facilitate data isolation for security purposes).

If there are attachments associated with the message communication, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

Figure 2:
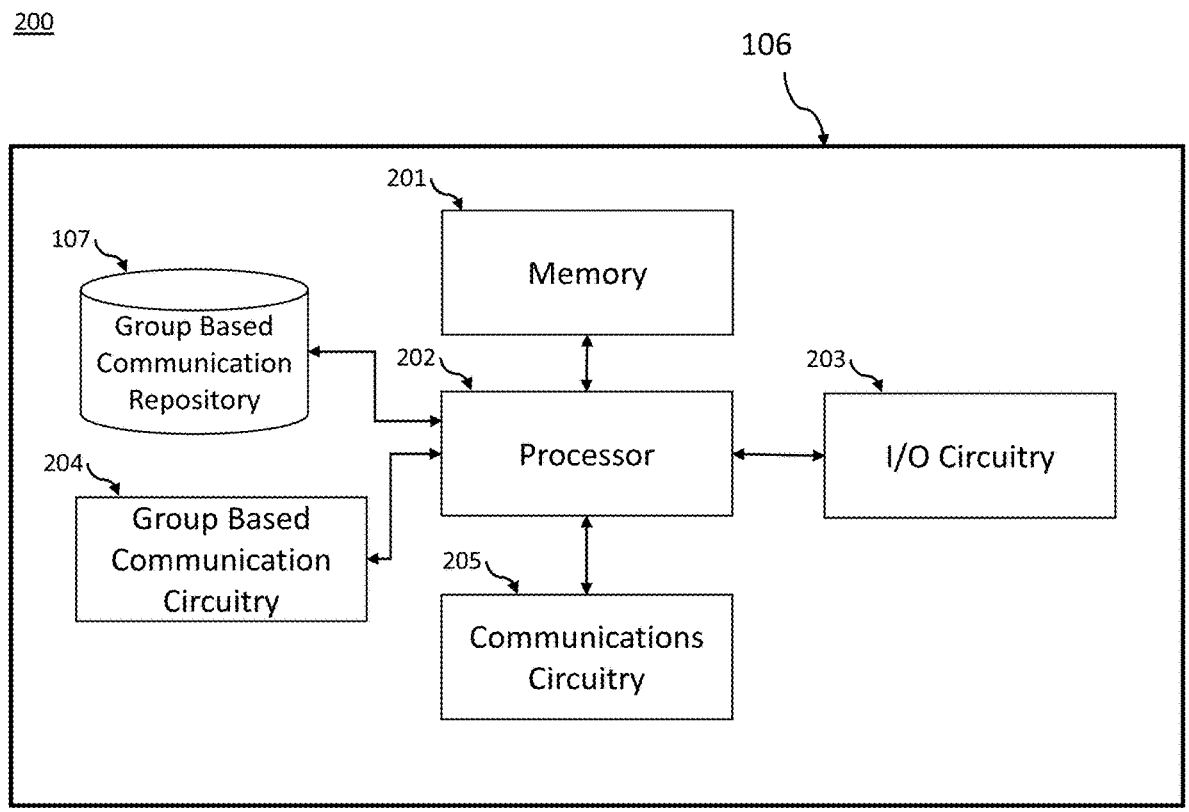
FIG. 2 illustrates an exemplary processing circuitry that may be utilized by one or more apparatuses of the present disclosure.

The group-based communication server 106 may be embodied by one or more computing systems, such as apparatus 200 shown in FIG. 2. The apparatus 200 may include a processor 202, a memory 201, input/output circuitry 203, communications circuitry 205, group-based communication repository 107 and group-based communication circuitry 204. The apparatus 200 may be configured to execute the operations described above with respect to FIG. 1 and below with respect to FIGS. 3-8. Although these components 107 and 201-205 are described with respect to functional limitations, it should be understood that the particular implementations necessarily include the use of particular hardware. It should also be understood that certain of these components 107 and 201-205 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or coprocessor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Process Overview

Figure 3:
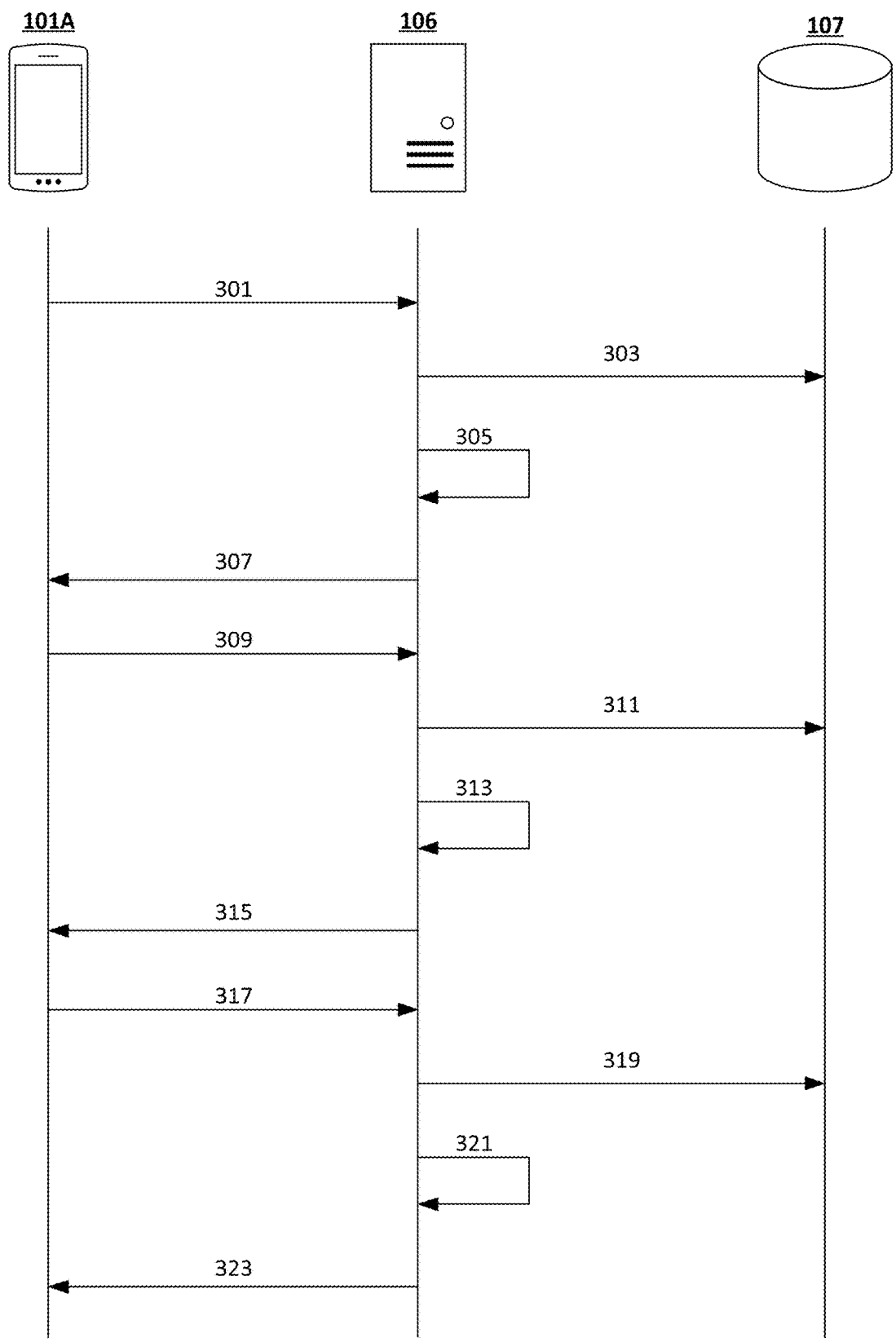
FIG. 3 illustrates an exemplary process according to embodiments of the present disclosure.

FIG. 3 illustrates an exemplary process 300 for providing a client device with renderable objects. At step 301, client device 101C requests a renderable priority object from group-based communication server 106. The renderable priority object, when rendered by client device 101C, produces a priority pane of a group-based communication interface within a defined display window on client device 101C. The depicted request indicates to group-based communication server 106 to retrieve a global identifier and one or more group-based communication channel identifiers from a user profile. In other embodiments, the request may comprise a global identifier and a group-based communication channel identifier.

In response to the request, at step 303, group-based communication server 106 accesses group-based communication repository 107 to retrieve unread direct messages and unread message communications corresponding to the retrieved global identifier. In one example, group-based communication server 106 utilizes a global identifier to query group-based communication repository for unread direct messages related to a user and group-based communication server 106 may utilize one or more retrieved group-based communication channel identifiers to query group-based communication repository 107 for unread message communications related to a user. The unread direct messages and the unread message communications may be grouped as an unread direct message set and an unread message communications set, respectively.

Figures 4A, 4B:
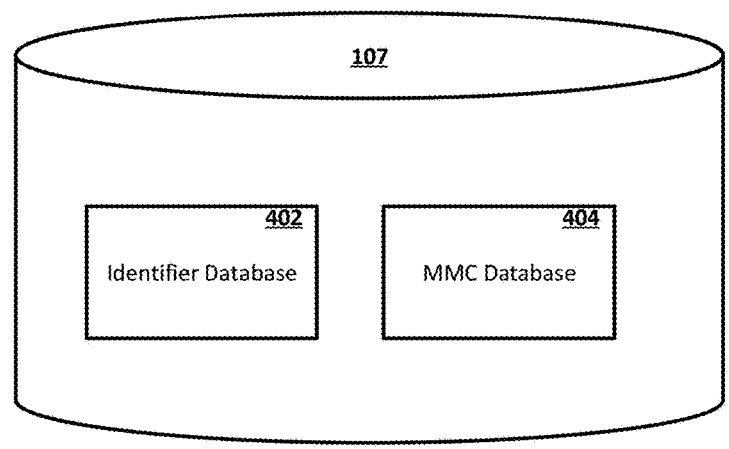
FIG. 4A illustrates an exemplary group-based communication repository according to embodiments of the present disclosure.
FIG. 4B illustrates an exemplary data table residing in a group-based communication repository according to embodiments of the present disclosure.

Now with reference to FIGS. 4A and 4B, group-based communication repository 107 comprises identifier database 402 and direct message and message communication (MMC) database 404. All of the data and message information stored in identifier database 402 is part of a user's profile. Each user of group-based communication system 105 may have a database table 406 entry in identifier database 402. In some embodiments, database table 406 includes global identifiers 408, full name values 410, preferred name values 412, and group/sub-group identifiers 414. The identifier database 402 may also include other aspects of user profile data.

Each member of an organization that utilizes the group-based communication system is associated with a global identifier. The global identifier is a unique number. In one embodiment, the global identifier may be stored (e.g., within the identifier database 402) as a 64 bit unsigned integer and represented externally (outside of memory) as a base34 encoded string. As a truncated example, the exemplary database table 406 illustrates global identifiers 408 in base34 encoded string form. The global identifier 408 uniquely identifies a single user in the group-based communication system 105. In embodiments where the group-based communication system 105 spans multiple organizations, the global identifier 408 is still only associated with a single user.

Whenever a direct message is created, group-based communication server 106 uses global identifiers to determine sender and recipient identification. For example, if Mary James wanted to send Walter White a direct message, Mary James' client device would include in the direct message metadata a sending user identifier of W12345678 and a recipient user identifier of W22222222.

Full name value 410 is a value that indicates a user's full name. As shown in FIG. 4B, the global identifier W12345678 is associated with a user whose full name is Mary James. Although full name value 410 is shown as a string it is possible to store the full name value in another form such as an integer, symbol, or character. This alternate storage method may be useful when the user's full name may include non ASCII characters, symbols, or various foreign characters. Regardless of how the full name value 410 is stored, it is rendered for display, on a client device, as a human readable string.

Preferred name value 412 is a value that indicates a user's preferred name. As shown in FIG. 4B the global identifier W12345678 is associated with a user whose full name is Mary James and preferred name is Mary. Although preferred name value 412 is shown as a string it is possible to store the preferred name value in another form such as an integer, symbol, or character. This alternate storage method may be useful when the user's preferred name may include non ASCII characters, symbols, or various foreign characters. Regardless of how the preferred name value is stored, it is rendered for display, on a client device, as a human readable string.

The preferred name value 412 allows the users in the group-based communication system to refer to or mention other users in a casual and friendly language as opposed to using usernames or global identifiers. This helps increase the usability of the group-based communication system. For example, suppose Walter White (as shown in FIG. 4B) would like to tag/mention Mary James in a message communication within a group-based communication channel. Walter, via his client device, can enter the text "Hey @Mary look at the attachment from 8/17/2017." This is preferable to using a unique username for Mary, which may read "Hey @mdjames70596 look at the attachment from 8/17/2017." Often usernames uniquely refer to users, but the usernames are also unique texts themselves, such that no two usernames are or can be the same. This is problematic because it forces users to memorize, recall, or at least identify a user by their user identifier. Instead it is preferable to refer to a user as one would in real life, which is typically by their preferred name. In some embodiments, instead of referring to a user by preferred name value a user may be referred to by full name value. Recalling the example above, Walter White may mention Mary James in a message communication within a group-based communication channel by entering the text "Hey @Mary James look at the attachment from 8/17/2017."

Group/sub-group identifier 414 is a value that indicates which groups or sub-groups a user is associated with or belongs to. In some embodiments, a user is associated with one group identifier (e.g., Slack Corporation) and one or more sub-group identifiers (e.g., accounting, reading book club member, community service committee member, etc.). In reference to David Le in FIG. 4B, David has a group identifier (004) indicating that he is an employee of Slack Corporation and a sub-group identifier indicating his association with the domestic sales group. In contrast, a group-based communication system named Amy (not shown in FIG. 4B, may have a group identifier (003) indicating that she is an employee of ABC Company and a sub-group identifier indicating her association with ABC Company's security team.

A user status value may also be included (not shown) in database table 406. A user status value refers to one or more items of data that indicates a user's status within the organization or a group. For example, Mary James may have a user status value of "Security Team Lead." In another embodiment, a user status value may indicate if the user is currently on the phone, in a meeting, on vacation, available, and the like.

A group-based communication channel identifier may also be included (not shown) in database table 406. The group-based communication channel identifier indicates which group-based communication channels each user belongs to. Furthermore, different users may have different authorizations within each group-based communication channel and these authorization rights may be indicated in database table 406.

A group-based communication channel access count may also be included (not shown) in database table 406. The group-based communication channel access count indicates the frequency that a client device associated with a user accesses a corresponding group-based communication channel.

A user avatar may also be included (not shown) in database table 406. A user avatar is a digital visual representation of a user. The avatar may be digital photo of the user or an electronically created digital caricature of the user.

The use of full name values, preferred name values, and global identifiers allows the group-based communication system to accommodate international users. As shown in FIG. 4B, Taro Yamada is a Japanese employee in the international mobile group. Taro frequently works with both U.S. and Japanese colleagues. Taro's full name value would comprise of his name in English name as well as his name in Japanese (山田 太郎). Similarly, Taro's preferred name value would comprise his preferred name in English (Taro) as well as his preferred name in Japanese (Taro-chan or 太郎ちゃん). By associating Taro's user profile with his English and Japanese full name value and English and Japanese preferred name value, the group-based communication system may recognize both. For example, Taro's Japanese colleagues may mention him using "太郎ちゃん" and Taro's English colleagues may mention him by using "Tar." This allows the group-based communication system to accommodate those users with not only multiple names but international names because the full name and preferred name values are values associated with a user's unique global identifier. As a result, the group-based communication system may support non ASCII characters.

MMC database 404 stores direct messages, corresponding direct message information, message communications, and corresponding message information used in group-based communication system 105. Each stored direct message or message communication is indexed in memory by one or more identifiers, which allows group-based communication server 106 to easily find desired direct message or message communications.

In one embodiment, a direct message is indexed by a sending user's global identifier and/or a recipient's global identifier. For example, if user Mary James wants to send a direct message to Walter White saying "Hi Walter, can we meet at 10 am?" a client device associated with Mary James would identify Walter by his global identifier. Next, the client device associated with Mary James would send the direct message "Hi Walter, can we meet at 10 am?" with direct message information indicating Walter White's global identifier as the recipient identifier and Mary James' global identifier as the sending user identifier to group-based communication server 106. Group-based communication server 106 would store the direct message and corresponding direct message information in MMC database 404 and index the direct message according to both Mary James and Walter White's global identifier. By doing so, in the future, group-based communication server 106 may simply search MMC database 404 for Mary James' global identifier to find direct messages related to her.

Direct message information may include metadata that indicates which global identifiers have viewed the direct message (and by implication which have not yet done so). For example, when a direct message is sent, initially, some recipients will have not yet viewed the direct message. However, when a user associated with a global identifier (i.e., recipient identifier) selects and opens, via a client device, a direct message the client device will send an indicator to group-based communication server 106. The group-based communication server 106 then updates the unread message flag associated with the direct message to indicate a read, as opposed to unread, status. In alternate embodiment, an app of the group-based communication system running on the client device may update the unread message flag associated with the direct message when a user selects and opens an unread direct message.

Group-based communication server 106 may further update a direct message repository to indicate the direct message at issue was viewed by the global identifier associated with the viewing user. In this way, the group-based communication server 106 may track user engagement (i.e., opening, viewing, etc.) with direct messages of a group-based communication interface.

Message communications and corresponding message communication information may be stored and updated in a similar fashion. Message communications, unlike direct message, are configured to be displayed in group-based communication channels. Within MMC database 404, each group-based communication channel has a distinct storage location. These storage locations may be indexed by various identifiers such as group-based communication channel identifiers, group identifiers, and/or sub-group identifiers. In some example embodiments, a group-based communication channel may be accessible only by members of designated groups (e.g., Slack Corporation) or sub-groups (e.g., mobile sales, human resources, etc.). For example, a group-based communication channel entitled "mobile sales" may have access control parameters that indicate to group-based communication server 106 that only users that have a group identifier indicating Slack Corporation credentials and a sub-group identifier indicating "mobile" or "international sales" affiliations are able to access the storage location associated with the Slack Corp. "mobile sales" channel.

FIG. 4B depicts a database table 406 that is configured to host data of a specified group (i.e., group identifier 004 of Slack Corporation). However, database table 406 provides for a variety of global identifier to sub-group identifier associations. For example, by referencing the relationships associated in database table 406, the group-based communication system may configure a client device associated with Mary James and a client device associated with Walter White to access message communications for the "mobile" sub-group.

In one example embodiment, message communications information may include metadata that indicates which global identifiers have been associated with "views" (i.e., user directed opens or views) of the message communication. For example, when a message communication is sent, initially, no member of the corresponding group-based communication channel may have viewed the message communication. Group-based communication server 106 may generate, as message communication information, a list of global identifiers that are authorized to view this message. In order to do this, group-based communication server 106 may access an access control list associated with the group-based communication channel and determine one or more group/sub-group identifiers that indicate access to the group-based communication channel.

Once group-based communication server 106 has the authorized group/sub-group identifiers, it can query identifier database 402 of group-based communication repository 107 to find all the global identifiers that have authorized group/sub-group identifiers in their user profile data. From this query, group-based communication server 106 may initially set unread message flag(s) to indicate that the message communication is unread by all global identifiers. However, when a user associated with a global identifier selects and opens, via a client device, a message communication, the client device will cause the appropriate unread message flag(s) to be update to indicate a read status associated with the viewing user's global identifier. Thus, group-based communication server 106 may accurately determine which global identifiers have and have not read each message communication.

Now with returned reference to FIG. 3, at step 305, group-based communication server 106 generates a renderable priority object based on one or more unread direct messages and/or one or more unread message communications. This process is further described below in reference to FIG. 5.

Figure 8:
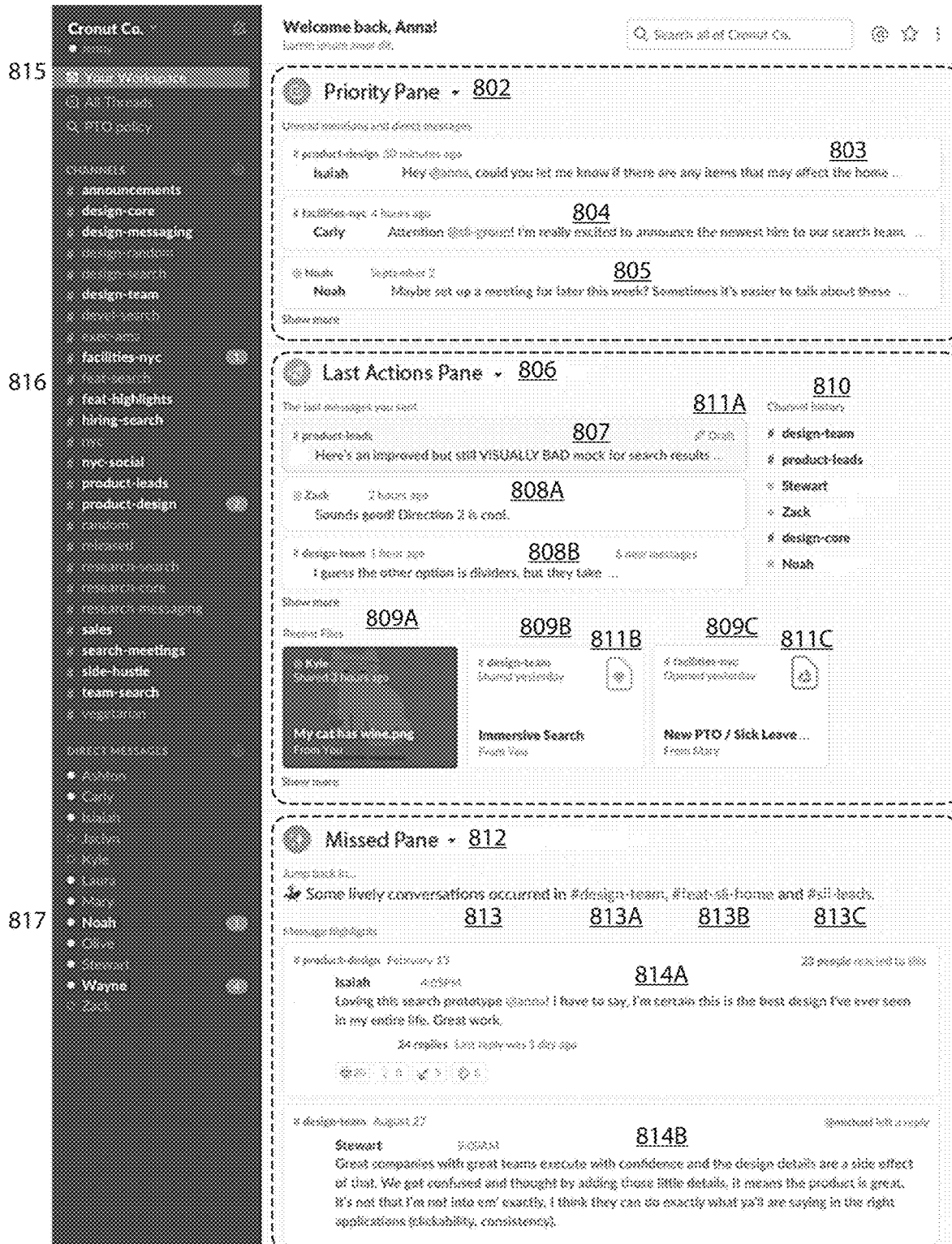
FIG. 8 illustrates an exemplary graphical user interface according to embodiments of the present disclosure.

At step 307, group-based communication server 106 transmits the renderable priority object to client device 101C. Client device 101C is configured to render the renderable priority object to produce a priority pane within a group-based communication interface. An example priority pane 802 rendered within a group-based communication interface 800 is shown in FIG. 8.

At step 309, client device 101C requests a renderable last actions object from group-based communication server 106. The renderable last actions object, when rendered by client device 101C, produces a last actions pane within a group-based communication interface. An example last actions pane 806 rendered within a group-based communication interface 800 is shown in FIG. 8.

In response to the request, at step 311, group-based communication server 106 uses the global identifier associated with the request to query group-based communication repository 107 and locate one or more sent message communications, one or more incomplete message communications, one or more sent direct messages, and/or one or more incomplete direct messages indexed in association with the global identifier.

MMC database 404 stores sent message communications and incomplete message communications used in group-based communication system 105. Each stored sent message commination or incomplete message communication is indexed in memory by one or more identifiers, which allows group-based communication server 106 to find desired sent message communications or incomplete message communications in connection with its step 311 query.

In one embodiment, a sent message communication may be indexed by both a sending user's global identifier and/or a recipient identifier. For example, if user Mary James sends a message communication to the group-based communication channel entitled "mobile team channel" saying "Hi team, can we meet at 10 am?", a client device associated with Mary James would identify the group-based communication channel "mobile team channel" by its group-based communication channel identifier. Next, the client device associated with Mary James would send the message communication "Hi Walter, can we meet at 10 am?" with message communication information indicating the mobile team channel identifier as the recipient identifier and Mary James' global identifier as the sending user's identifier to group-based communication server 106. Group-based communication server 106 would store the sent message communication and the corresponding message communication information in MMC database 404 and index the sent message communication according to both Mary James' global identifier and the mobile team channel identifier. After doing so, group-based communication server 106 may simply query MMC database 404 for Mary James' global identifier and/or group-based communication channel identifiers associated with Mary James' global identifier to find sent message communications related to her.

A similar process is followed to store and retrieve sent direct messages. However, in most embodiments, direct message information that indicates a recipient would indicate another user(s) global identifier(s) instead of a group-based communication channel identifier.

Similarly, group-based communication server 106 may store and retrieve incomplete message communications. In one embodiment, an incomplete message communication may be indexed by a sending user's global identifier and/or a recipient identifier. For example, if user Mary James types, via her client device (i.e., an app running on the client device), a message communication for the group-based communication channel entitled "mobile team channel" saying "Hi team, can we meet at 10 am?" but never actually posts the message communication, the client device associated with Mary James would send the incomplete message communication "Hi Walter, can we meet at 10 am?" with message communication information indicating the mobile team channel identifier as the recipient identifier and Mary James' global identifier as the sending user identifier to group-based communication server 106. Group-based communication server 106 stores the incomplete message communication in MMC database 404 and indexes the incomplete message communication according to both Mary James global identifier and the mobile team channel's channel identifier. In one embodiment, an unsent flag may be associated with the messaging communication information stored in association with the incomplete message communication.

Group-based communication server 106 may then simply search MMC database 404 for Mary James' global identifier and/or group-based communication channel identifiers associated with Mary James' global identifier to find incomplete message communications related to her. It should be noted that an incomplete message communication differs from a sent message communication in that an incomplete message communication is a draft (i.e., includes an unsent flag or a sent message flag having an unsent status or value) and is not transmitted to its intended recipient or posted to its intended group-based communication channel. Group-based communication server 106 may periodically (e.g., every one second) receive incomplete message communications from client device 101C. Although the incomplete message communications are transmitted to the group-based communication server 106, they are not sent by the user of the client device to an intended recipient (or posted to an intended channel) and thus are deemed by the system as incomplete message communications.

A similar process is followed to store and retrieve incomplete direct messages. However, in such embodiments, direct message information that indicates a recipient would indicate another user's global identifier instead of a group-based communication channel identifier.

In some embodiments, group-based communication server 106 may query group-based communication repository 107 and/or a memory associated with client device 101C to determine or otherwise identify one more one or more recently accessed files associated with the group-based communication system 105. Group-based communication system 105 supports many external applications and clients (such as Google Docs, GitHub, etc.) and group-based communication server 106 may retrieve actions the user of a client device has taken with respect to those external applications and clients by analyzing application log files or other app activity data (i.e., user application interaction indicators.)

For example, if a user, via a client device, accesses a file via Google Drive, group-based communication server 106 may retrieve data associated with this action from client device 101C and store such data as an application interaction indicator within a user's profile. This process enables group-based communication server 106 to store and track user actions within a group-based communication interface. As used within this disclosure, the term "recently accessed files" may refer to files or actions taken within a certain period or within an immediately preceding application session. For example, in one embodiment, recently accessed may mean within the last 24 hours, within the last 5 days, within the last month, and the like.

In some embodiments, group-based communication server 106 also accesses user profile data to determine a recent group-based communication channel history associated with a user. For example, group-based communication server 106 may access user profile data to retrieve one or more group-based communication channel access counts, which indicates to group-based communication server 106 the frequency and corresponding timestamps a user, via a client device, accesses one or more message communications in a particular group-based communication channel or series of group-based communication channels. From this information, group-based communication server 106 may determine a user's recent group-based communication channel history.

At step 313, group-based communication server 106 generates a renderable last actions object based on one or more sent message communications, one or more incomplete message communications, one or more sent direct messages, one or more incomplete direct messages, and/or a user's recent group-based communication channel history. In an embodiment, the renderable last actions object may include an indicator of one or more recently accessed files. This process is further described below in reference to FIG. 6.

At step 315, group-based communication server 106 transmits the renderable last actions object to client device 101C. Client device 101C is configured to render the renderable last actions object to produce a last actions object pane within a group-based communication interface. An example last actions object pane 806 rendered within a group-based communication interface 800 is shown in FIG. 8.

At step 317, client device 101C requests a renderable missed object from group-based communication server 106. The renderable missed object, when rendered by client device 101C, produces a missed pane within a group-based communication interface. An example missed pane 812 rendered within a group-based communication interface 800 is shown in FIG. 8.

In response to the request, at step 319, group-based communication server 106 uses the global identifier associated with the request to query group-based communication repository 107 to retrieve unread direct messages and unread message communications corresponding to retrieved user profile data. Group-based communication server 106 utilizes the global identifier to query group-based communication repository 107 for unread direct messages related to a user. Group-based communication server 106 may utilize one or more retrieved group-based communication channel identifiers to query group-based communication repository 107 for unread message communications related to a user. The unread direct messages and the unread message communications may be grouped as an unread direct message set and an unread message communications set, respectively.

At step 321, group-based communication server 106 generates a renderable missed object based one or more unread direct messages and/or one or more unread message communications. This process is further described below in reference to FIG. 7.

At step 323, group-based communication server 106 transmits the renderable missed object to client device 101C. Client device 101C is configured to render the renderable missed object to produce a missed pane within a group-based communication interface. An example missed pane 812 rendered within a group-based communication interface 800 is shown in FIG. 8.

Although process 300 shows client device 101C requesting and receiving a priority object, last actions object, and a missed object, it is within the scope of this disclosure for client device 101C to only request and receive one or two of the objects with the remaining objects either not being generated (with the group-based communication interface omitting the corresponding pane(s)) or being generated automatically (with the group-based communication interface including the correspondence pane(s)).

In some embodiments, as discussed in greater detail below, the priority pane, the last actions pane, and the missed pane are configured to be displayed with the group-based communication interface simultaneously so that each is positioned efficiently within the defined display window. In other embodiments, one or more of such panes may be omitted with the group-based communication interface configured to resize any remaining panes for efficient display within the defined display window.

Priority Pane

Figure 5:
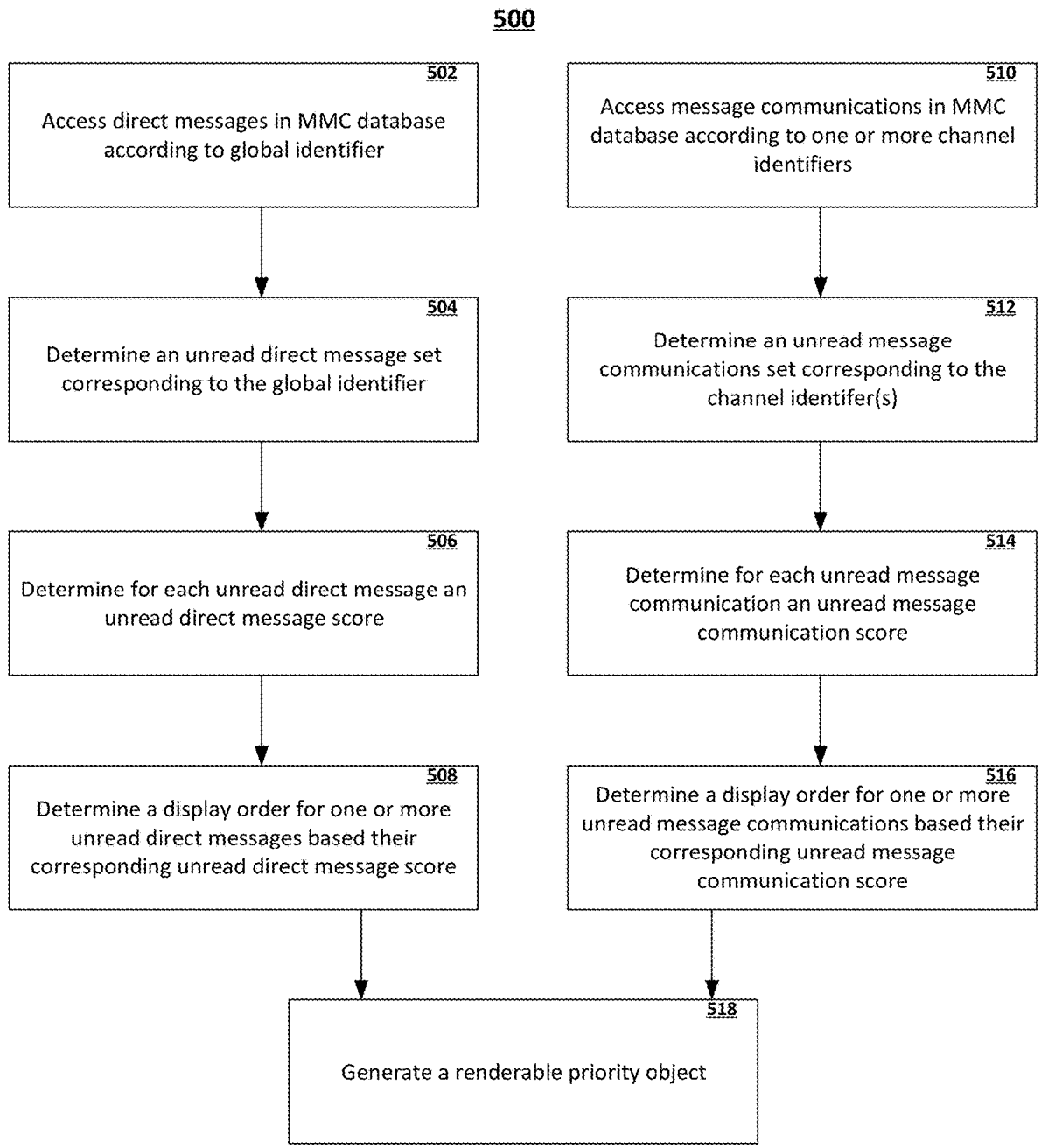
FIG. 5 illustrates an exemplary process performed by a group-based communication server according to embodiments of the present disclosure.

FIG. 5 describes an exemplary process 500 for generating a renderable priority object. At step 502, group-based communication server 106 queries MMC database 404 to access direct messages according to a global identifier. In some embodiments, as discussed above, step 502 is performed by the group-based communication server 106 in response to receiving a renderable priority object request (i.e., step 301 in FIG. 3). Such renderable priority object requests include a global identifier associated with the user that originated the request. Group-based communication server 106 queries group-based communication repository 107 to locate all direct messages and corresponding direct message information indexed according to the received global identifier.

At step 504, group-based communication server 106 determines an unread direct message set comprising of one or more unread direct messages corresponding to the global identifier. Once group-based communication server 106 retrieves direct messages relating to a global identifier it must filter those direct messages to identify only unread direct messages. In some embodiments, direct message information (unread or not) includes an unread message flag. In such embodiments, group-based communication server 106 simply checks the unread message flag to determine which of the retrieved direct messages is unread. Group-based communication server 106 also retrieves direct message information, other than the unread message flag, relating to the retrieved unread direct messages.

The direct message information contains a direct message timestamp for each of the unread direct messages. Group-based communication server 106 then determines the unread direct message set based on the retrieved direct message timestamp. For example, the unread direct message set may only comprise the 20, 15, 10, or 5 most recent unread direct messages, which is evaluated by comparing respective direct message timestamps to a group-based communication server system time.

In another example, the unread direct message set may comprise only unread direct messages received by group-based communication server 106 within a defined period (e.g., the last week, the last month, etc.) or within defined session(s), e.g., during the preceding two sessions initiated by a group-based communication system mobile app running on the client device associated with the global identifier at issue.

In another embodiment, the direct message information also contains an urgent indicator field and group-based communication server 106 may determine the unread direct message set based on the direct message timestamp and the urgent indicator field associated with each retrieved unread direct message. The urgent indicator field may be a binary flag or may include a numerical value (e.g., a value between 0 and 9). In one embodiment, the unread direct message set may only comprise unread direct messages received by group-based communication server 106 within a defined period (e.g., the last year, 6 months, 3 months, etc.) but such unread direct messages may also be weighted using the urgent indicator field (i.e., those having non-zero urgent indicator flags or values positioned favorably within the set while others are demoted or altogether excluded).

At step 506, group-based communication server 106 determines for each unread direct message in the unread direct message set an unread direct message score. After group-based communication server 106 determines which of the direct messages in MMC database 404 are in the unread direct message set, a score can be determined for each unread direct message within the set. In the depicted embodiment, the unread direct message score indicates the likely relevance of an unread direct message to the user of the requesting client device based on attributes of the unread direct message and user interest indicators retrieved from the user profile data associated with the requesting client device.

In another embodiment, group-based communication server 106 retrieves a direct message timestamp for each unread direct message in the unread direct message set. Group-based communication server 106 may score unread direct messages higher that have a more recent timestamp. In another embodiment, group-based communication server 106 retrieves the contents of an urgent indicator field associated with each of the unread direct messages in the unread direct message set. Group-based communication server 106 may score unread direct messages higher that have a higher level of urgency based on the urgent indicator field.

In another embodiment, group-based communication server 106 may access identifier database 402 to determine one or more user interest indicators from user profile data. Such user interest indicators may be a user status indicator, a user job indicator, and the like. Group-based communication server 106 may score unread direct messages higher when their contents (e.g., key terms, metadata, file contents, etc.) correspond to a user's status within an organization. For example, Mary James (see FIG. 4B) is a member of the security and mobile teams. Thus, group-based communication server 106 may score unread direct messages higher that include the terms "security", "mobile", and other related terms. For example, an unread direct message stating "Hi Mary, I was wondering when the security specifications relating to our latest mobile project will be ready" would be rated higher than a direct message stating "Hi Mary, do you want to meet for lunch today?" In another embodiment, group-based communication server 106 may use the user's job and the unread direct message sender's job in order to score an unread direct message. For example, an unread direct message from a user's supervisor may be rated higher than an unread direct message from someone on the same organizational level as the user.

In some embodiments, group-based communication server 106 may make use of one or more machine learning algorithms or statistical models to improve the scoring calculation. One or all of the factors identified above may be used to give each unread direct message a score.

At step 508, group-based communication server 106 determines a display order for one or more unread direct messages based on each unread direct message score. Group-based communication server 106 may organize each unread direct message within the unread direct message set in a list with the highest scoring unread direct message being arranged first and the lowest scoring unread direct message being arranged last. In some embodiments, group-based communication server 106 only considers unread direct messages above a particular threshold score for inclusion in the renderable priority object.

In a parallel process, at step 510, group-based communication server 106 retrieves message communications in MMC database 404 according to one or more group-based communication channel identifiers in an a user's profile. In various embodiments, such channel identifiers are obtained following receipt of a renderable priority object request (i.e., step 309 in FIG. 3). In the depicted embodiment, the renderable priority object request includes a global identifier. Group-based communication server 106 queries group-based communication repository 107 to locate user profile data associated with the global identifier. Once group-based communication server 106 determines user profile data it can recover one or more group-based communication channel identifiers in the user profile data.

Group-based communication server 106 then queries storage locations within the group-based commutation repository 107 indexed by the retrieved group-based communication channel identifiers to retrieve one or more unread message communications and corresponding message communication information associated with such group-based communication channel identifiers. In this way, the group-based communication server 106 obtains the one or more unread message communications and corresponding message communication information that originate from group-based communication channels to which the user at issue is a member.

At step 512, group-based communication server 106 determines an unread message communication set comprising one or more unread message communications. Once group-based communication server 106 finds message communications relating to a group-based communication channel identifier it must filter those message communications to find only unread message communications. In some embodiments, each message communication (unread or not) will have an unread message flag for each authorized global identifier. An authorized global identifier is a global identifier that corresponds to a user profile that includes the specific group-based communication channel identifier. In such an embodiment, the group-based communication server may simply check the unread message flag to determine which one of the retrieved message communications is unread.

The message communication information contains a message communication timestamp for each of the unread message communications. In one embodiment, group-based communication server 106 determines the unread message communication set based on the retrieved message communication timestamp. For example, the unread message communication set may only comprise the 20, 15, 10, or 5 most recent unread message communications. In another example, the unread message communication set may comprise only unread message communications received by group-based communication server 106 within a time period (e.g. the last week, the last month, etc.) or within defined session(s).

In another embodiment, the message communication information also contains an urgent indicator field and group-based communication server 106 may determine the unread message communication set based on the message communication timestamp and the urgent indicator field associated with each retrieved unread message communication. As discussed above, the urgent indicator field may be a binary flag or a numerical value. In one embodiment, the unread message communication set may only comprise unread message communications received by group-based communication server 106 within a time period (e.g., the last year, 6 months, 3 months, etc.) but such unread message communications may also be weighted using the urgent indicator field (i.e., those having non-zero urgent indicator flags or values are positioned favorably with the set while others are demoted or altogether excluded).

At step 514, group-based communication server 106 determines for each unread message communication in the unread message communication set an unread message communication score. After group-based communication server 106 determines which of the message communication in MMC database 404 are in the unread message communication set, a score can be determined for each unread message communication within the set. In the depicted embodiment, the unread message communication score indicates the likely relevance of an unread message communication to the user of the requesting client device based on attributes of the unread message communication and user interest indicators retrieved from the user profile data associated with the requesting client device. In another embodiment, the unread message communication score may be further based on attributes of group-based communication channels (i.e., channel topics, channel metadata, channel membership groups, etc.) that correspond to retrieved group-based communication channel identifiers.

In one embodiment, group-based communication server 106 retrieves a message communication timestamp for each unread message communication in the unread message communication set. Group-based communication server 106 may score unread message communications higher that have a more recent message communication timestamp. In another embodiment, group-based communication server 106 retrieves the contents of an urgent indicator field associated with each of the unread message communications. Group-based communication server 106 may score unread message communications higher that have a higher level of urgency based on the urgent indicator field.

In one embodiment, group-based communication server 106 may access identifier database 402 to determine one or more user interest indicators from user profile data. Such user interest indicators may be a user status indicator, a user job indicator and the like. Group-based communication server 106 may score unread message communications higher when their contents (e.g., key terms, metadata, file contents, etc.) correspond to a user's status within an organization. For example, Mary James (see FIG. 4B) is a member of the security and mobile teams. Thus, group-based communication server 106 may score unread message communications higher that mention the terms "security", "mobile", and other related terms. For example, an unread message communication stating "@channel, does anyone know when the security specifications relating our latest mobile project will be ready?" would be scored higher than an unread message communication stating "@channel, does anyone feel like Chinese for lunch today?"

In another embodiment, group-based communication server 106 may use the user's job and the message communication sender's job in order to score an unread message communication. For example, a message communication from a user's supervisor may be rated higher than a message communication from someone on the same organizational level as the user. In another embodiment, group-based communication server 106 may score unread message communications higher that appear in group-based communication channels related to a user's status within the organization. For example, if Mary James' job is Vice President of the mobile group in an organization, an unread message communication in a "mobile division channel" would be rated higher than an unread message communication in a "work happy hour channel."

In some embodiments, group-based communication server 106 may make use of one or more machine learning algorithms or statistical models to improve the scoring calculation. One or all of the factors identified above may be used to give each unread message communication a score.

At step 516, group-based communication server 106 determines a display order for one or more unread message communications based on their corresponding unread message communication score. Group-based communication server 106 may organize each unread message communication in the unread message communication set in a list according to the determined display order with the highest scoring unread message communication being first and the lowest scoring unread message communication being last. In some embodiments, group-based communication server 106 will only consider unread message communications that exceed a particular threshold score for inclusion in the renderable priority object.

At step 518, group-based communication server 106 generates a renderable priority object based on the determined display orders for the unread direct messages (determined at steps 502-508) and the unread message communications (determined at steps 510-516). The renderable priority object includes one or more unread direct messages and/or one or more unread message communications and corresponding display orders. In one embodiment, the unread direct messages and the unread message communications are respectively grouped and presented in the priority pane of the group-based communication interface according to their respective display orders.

In another embodiment, group-based based communication server 106 may group the unread direct messages and the unread message communications together and determine a single display order for arranging the combined grouping within the priority pane. In such an embodiment, group-based communication server 106 may disperse unread direct messages within unread message communications if such is dictated by their respective scores.

Last Actions Pane

Figure 6:
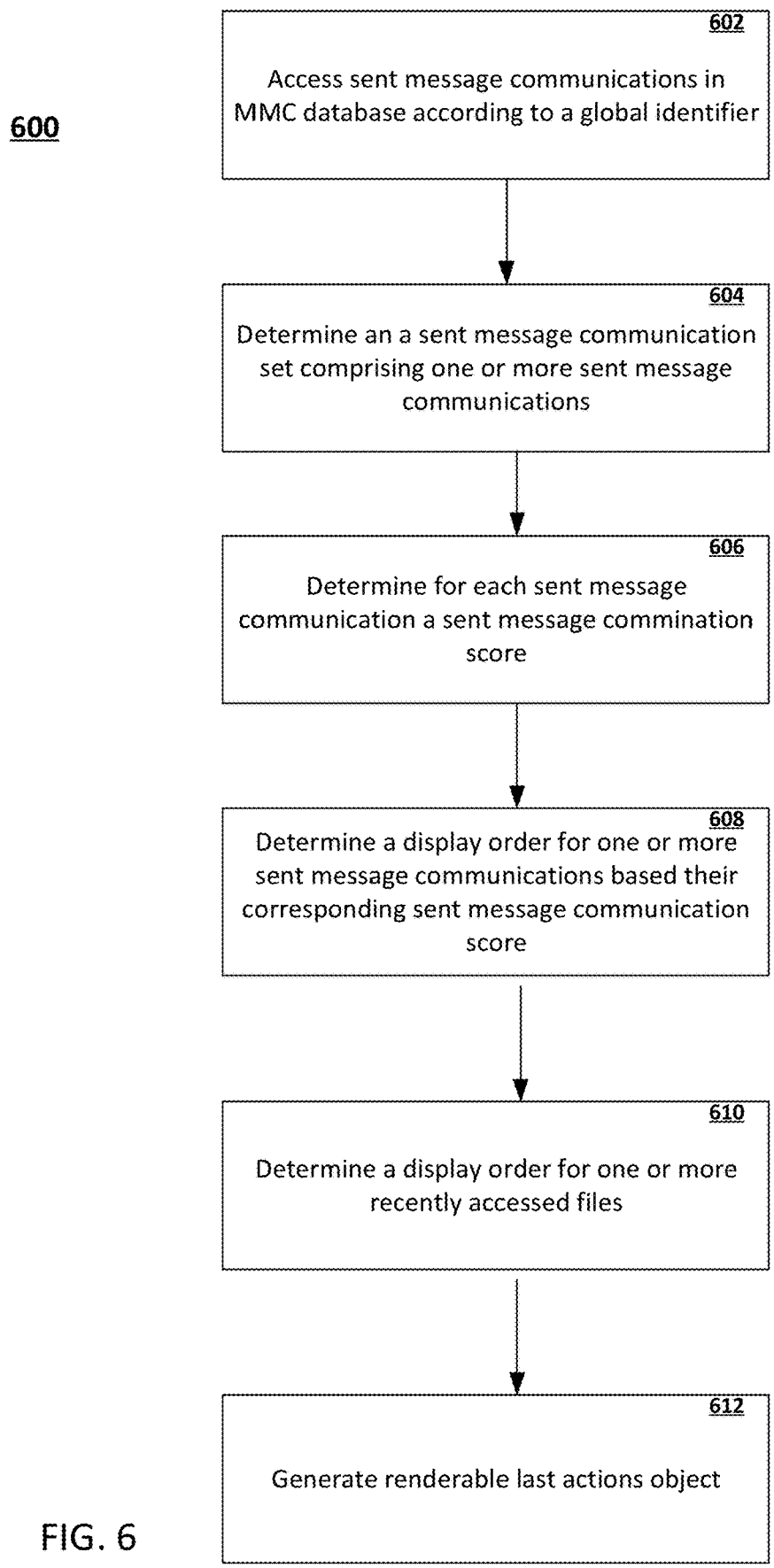
FIG. 6 illustrates an exemplary process performed by a group-based communication server according to embodiments of the present disclosure.

FIG. 6 illustrates exemplary process 600 for a group-based communication server 106 to generate a renderable last actions object. At step 602, group-based communication server 106 queries direct messages in MMC database 404 according to a global identifier. In some embodiments, as discussed above, step 602 is performed in response to receiving a renderable last actions object request (i.e., step 309 in FIG. 3). In the depicted embodiment, the renderable last actions object request includes a global identifier. Group-based communication server 106 queries group-based communication repository 107 to locate all sent message communications and corresponding message communication information, incomplete message communications and corresponding message communication information, sent direct messages and corresponding direct message information, incomplete direct messages and corresponding direct message information, and recently accessed files indexed according to the received global identifier.

At step 604, group-based communication server 106 determines a sent message communication set comprising one or more sent message communications. Once group-based communication server 106 finds sent message communications relating to a group-based communication channel identifier, it must determine which of those sent message communications are in the sent message communication set. The message communication information contains a message communication timestamp for each of the sent message communications. Group-based communication server 106 then determines the sent message communication set based on the retrieved message communication timestamp. For example, the sent message communication set may only comprise the 20, 15, 10, or 5 most recent sent message communications.

In another example, the sent message communications set may only comprise sent message communications received by group-based communication server 106 within a time period (e.g., the last week, the last month, etc.) or within defined session(s), e.g., during the preceding two sessions initiated by the group-based communication mobile app running on the client device associated with the global identifier at issue.

In another embodiment, the message communication information also contains an urgent indicator field and group-based communication server 106 may determine the sent message communication set based on the message communication timestamp and the urgent indicator field associated with each retrieved sent message communication. As discussed above, the urgent indicator field may be a binary flag or a numerical value. For example, the sent message communication set may only comprise unread message communications received by group-based communication server 106 within a time period (e.g., the last year, 6 months, 3 months, etc.) but such sent message communications may also be weighted using the urgent indicator field (i.e., those having non-zero urgent indicator flags or values are positioned favorably with the set while others are demoted or altogether excluded).

At step 604, group-based communication server 106 determines, for each sent communication in the sent communication set, a sent message communication score. The sent message communication score indicates the relevance of a sent message communication to the user of the requesting client device based on attributes of the sent message communication, user interest indicators, and/or attributes of the user profile data associated with the requesting client device.

In one embodiment, group-based communication server 106 retrieves a message communication timestamp and group-based communication server 106 may score sent message communications higher that have a more recent timestamp. In another embodiment, group-based communication server 106 retrieves the contents of an urgent indicator field associated with each of the sent message communications in the sent message communication set. Group-based communication server 106 may score sent message communications higher that have a high level of urgency based on the urgent indicator field.

In one embodiment, group-based communication server 106 may access identifier database 402 to determine one or more user interest indicators from user profile data. Such user interest indicators may include a user status indicator, a user job indicator, and the like. Group-based communication server 106 may score sent message communications higher when their contents correspond to a user's status within an organization. For example, Mary James (see FIG. 4B) is a member of the security and mobile teams. Thus, group-based communication server 106 may score sent message communications higher that mention the terms "security", "mobile", and other related terms. For example, a sent message communication stating "@channel, does anyone know when the security specifications relating to our latest mobile project will be ready?" would be rated higher than a sent message communication stating "@channel, does anyone want burgers for lunch today?"

In another embodiment, group-based communication server 106 may score sent message communications higher that appear in group-based communication channels related to a user's status within the organization. For example, if Mary James' job is Vice President of the mobile group in an organization, a sent message communication in a "mobile division channel" would be rated higher than a sent message communication in a "work happy hour" channel. One or all of the factors identified above may be used to give each sent message communication a score.

At step 608, group-based communication server 106 determines a display order for one or more sent message communications based on their corresponding sent message communication score. Group-based communication server 106 may organize each sent message communication in the sent message communication set into a list with the highest scoring sent message communication being arranged first and the lowest scoring unread message communication being arranged last. In some embodiments, group-based communication server 106 only considers sent message communications that have exceeded a particular threshold score for inclusion in the renderable last actions object.

Although steps 602-608 were described in terms of sent message communications, the same processes (incorporating similar scoring factors as may be apparent to one of ordinary skill in the art in view of this disclosure) may be applied to determining incomplete message communications scores, determining sent direct message scores, determining sent incomplete direct message scores and corresponding display orders for the incomplete message communications, the sent direct messages, and the incomplete direct messages.

At step 610, group-based communication server 106 determines a display order for one or more recently accessed files. To determine one or more recently accessed files, group-based communication server 106 may use a user's global identifier to access user profile data to determine which files a user associated with a client device accessed as well as user application interaction indicators that indicates a user's interactions, via a group-based communication interface, with third party applications or services. The user profile data also stores a timestamp associated with each file access event and/or user interaction. Thus, group-based communication server 106 may access user profile data to determine which files were recently accessed by the user of a client device. To determine a display order, group-based communication server 106 may organize each recently accessed file in a list with the most recently accessed file being arranged first and the least recently accessed file being arranged last.

At step 612, group-based communication server 106 generates a last actions object based on the determined display orders for the sent message communications, incomplete message communications, sent direct messages, incomplete direct messages, and recently accessed files. The last actions object includes one or more sent message communications, incomplete message communications, sent direct messages, incomplete direct messages, and recently accessed files, and display orders corresponding to each. In some embodiments, display order associated rules may dictate that only a predetermined number (e.g., 3, 5, 10, etc.) of sent message communications, incomplete message communications, sent direct messages, incomplete direct messages, and recently accessed files are included in the last actions object.

In one embodiment, the sent message communications, incomplete message communications, sent direct messages, incomplete direct messages, and recently accessed files are respectively grouped and presented in a last actions pane of the group-based communications interface according to their respective display orders. In another embodiment, group-based based communication server 106 may group the sent message communications, incomplete message communications, sent direct messages, incomplete direct messages, and recently accessed files together and determine a single display order for arranging the combined grouping within the last actions pane. In such an embodiment, group-based communication server 106 may disperse one or more of the sent message communications, incomplete message communications, sent direct messages, incomplete direct messages, and recently accessed files among the others if such is dictated by their respective scores.

Missed Pane

Figure 7:
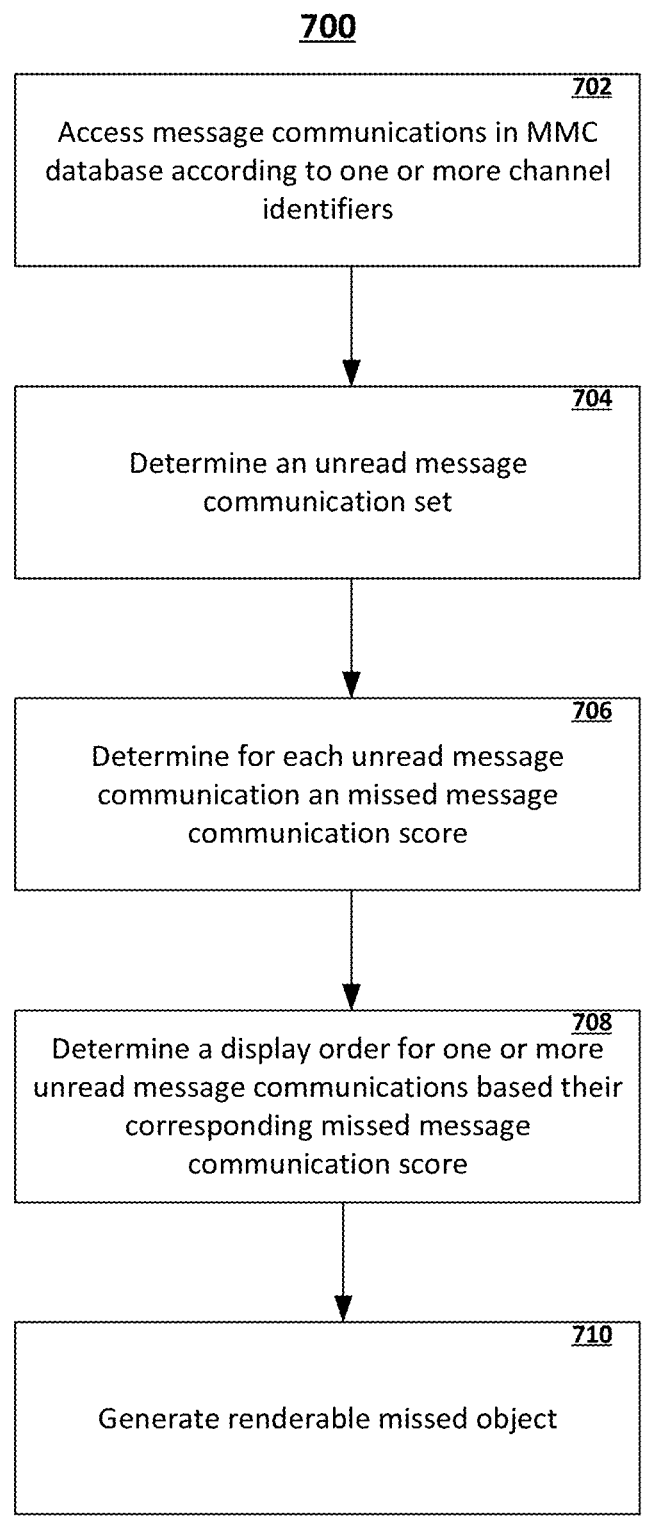
FIG. 7 illustrates an exemplary process performed by a group-based communication server according to embodiments of the present disclosure.

FIG. 7 illustrates exemplary process 700 for generating a renderable missed object. At step 702, group-based communication server 106 queries MMC database 404 with one or more group-based communication channel identifiers obtained from a user profile. In some embodiments, such group-based communication channel identifiers are following receipt of a renderable missed object request (i.e., step 317 in FIG. 3). In the depicted embodiment, the renderable missed object request includes a global identifier. Group-based communication server 106 queries group-based communication repository 107 to locate user profile data associated with the global identifier. Once group-based communication server 106 determines user profile data, group-based communication server 106 retrieves one or more group-based communication channel identifiers from the user profile data.

Group-based communication server 106 then queries storage locations within the group-based communication repository 107 indexed by the retrieved group-based communication channel identifiers to locate all message communications and corresponding message communication information that are associated with such group-based communication channels. In this way, the group-based communication server 106 obtains message communications that originate from group-based communication channels to which the user at issue is a member.

At step 704, group-based communication server 106 determines an unread message communication set comprising one or more unread message communications corresponding to the group-based communication channel identifiers. Once group-based communication server 106 finds message communications relating to a group-based communication channel identifier it must filter those message communications to find only unread message communications. In some embodiments, each message communication information (unread or not) will have an unread message flag for each authorized global identifier. In such an embodiment, the group-based communication server 106 may simply check the unread message flag to determine which one of the retrieved message communication is unread for each authorized user (i.e., each retrieved global identifier).

The message communication information contains a message communication timestamp for each of the unread message communications. Group-based communication server then determines the unread message communication set based on the retrieved message communication timestamps. For example, the unread message communication set may only comprise the 20, 15, 10, or 5 most recent unread message communications. In another example, the unread message communication set may only comprise unread message communications received by group-based communication server 106 within a defined time period (e.g., the week, the last month, etc.) or within defined session(s).

In another embodiment, the message communication information also contains an urgent indicator field and group-based communication server 106 may determine the unread message communication set based on the message communication timestamp and the urgent indicator field associated with each retrieved unread message communication. As discussed above, the urgent indicator field may be a binary flag or a numerical value. In one embodiment, the unread message communication set may only comprise unread message communications received by group-based communication server 106 within a time period (e.g. the last week, the last month, etc.) but such unread message communications may also be weighted based on the urgent indicator field (i.e., those having non-zero urgent indicator flags or values are positioned favorably with the set while others are demoted or altogether excluded).

At step 706, group-based communication server 106 determines, for each unread message communication in the unread message communication set, a missed message communication score. After group-based communication server 106 determines which of the message communications in MMC database 404 are in the unread message communication set, a score can be determined for each unread message communication within the set. The missed message communication score indicates the relevance of an unread message communication to the user of the requesting client device based on attributes of the unread message communication, user interest indicators within the user profile data associated with the requesting client device, and/or attributes of group-based communication channels that correspond to retrieved group-based communication channel identifiers.

In one embodiment, group-based communication server 106 retrieves a message communication timestamp for each unread message communication in the unread message communication set. Group-based communication server 106 may score unread message communications higher that have a more recent message communication timestamp. In another embodiment, group-based communication server 106 retrieves the contents of an urgent indicator field associated with each of the unread message communications. Group-based communication server 106 may score unread message communications higher that have a higher level of urgency based on the urgent indicator field.

In one embodiment, group-based communication server 106 may access identifier database 402 to determine one or more user interest indicators from user profile data. Such user interest indicators may include a user status indicator, a user job indicator and the like. Group-based communication server 106 may score unread message communications higher when their contents correspond to a user's status within an organization. For example, Mary James (see FIG. 4B) is a member of the security and mobile teams. Group-based communication server 106 may score unread messages higher that mention the terms "security", "mobile", and other related terms. For example, an unread message communication stating "@channel, does anyone know when the security specifications relating to our latest mobile project will be ready?" would be rated higher than an unread message communication stating "@channel, does anyone want burgers for lunch today?"

In another embodiment, group-based communication server 106 may use the user's job and the message communication sender's job in order to score an unread message communication. For example, a message communication from a user's supervisor may be rated higher than a message communication from someone on the same organization level as the user. In another embodiment, group-based communication server 106 may score unread message communications higher that appear in group-based communication channels related to a user's status within the organization. For example, if Mary James' job is Vice President of the mobile group in an organization, an unread message communication in a "mobile division channel" would be rated higher than an unread message communication in a "work happy hour" channel.

In some embodiments, group-based communication server 106 may make use of one or more machine learning algorithms or statistical models to improve the scoring calculation. One or all of the factors identified above may be used to give each unread message communication a score.

In another embodiment, group-based communication server 106 considers a group-based communication channel access count as it applies to each group-based communication channel identifier in the user's profile data to determine a missed message communication score. For example, Mary James is a member of the "security A team" channel and has a group-based communication channel access count for this channel of 2 indicating to group-based communication server 106 that Mary James, via a client device, has accessed one or more message communications in the "security A team" channel 2 times in the last 7 days. Mary James is also a member of the "security B team" channel and has a group-based communication channel access count for this channel of 100 indicating to group-based communication server 106 that Mary James, via a client device, has accessed one or more message communications in the security B team channel 100 times in the last 7 days. Considering this information, group-based communication server 106 may automatically rank higher unread message communications coming from the "security A team" channel because Mary James is statistically less likely to check (or be interested in) the security A team channel. This scoring criteria may be combined with any others discussed above, as will be apparent to one of ordinary skill in the art in view of this disclosure, to determine a missed message communication score.

In another embodiment, group-based communication server 106 considers one or more user application interaction indicators when determining a missed message communication score. For example, Mary James may frequently access files via Google Drive®. Each time Mary James access a Google Drive® file, via group-based communication system 105, a client device, indicates this action (e.g., as an access event log, etc.) to group-based communication server 106. Group-based communication server 106 may then store, in the user's profile, a user application interaction indicator that indicates Mary James access history for a particular file stored in Google Drive® or, more generally, for the Google Drive® service itself.

Considering the above information, group-based communication server 106 may automatically rank lower unread message communications that contain files or links to files on Google Drive®. This is because, according to stored user application interaction indicators, Mary James is more likely, in her daily actions, to check her Google Drive® and correspondingly less likely to check other files (e.g., Dropbox®.) Thus, it may be more likely that Mary James missed a message communication that contains a Dropbox® file. This scoring criteria may be combined with any others discussed above to determine a missed message communication score.

In another embodiment, group-based communication server 106 considers a group-based communication channel member discussion frequency indicator when determining a missed message communication score. Group-based communication server 106 may determine the frequency with which it receives message communications for each group-based communication channel. This information can then be accessed by group-based communication server 106 to indicate when a group-based communication channel associated with a group-based communication channel identifier in a user's profile data is trending.

For example, group-based communication server 106 may access a user profile to determine one or more group-based communication channel identifiers associated with a user and then determine group-based communication channel member discussion frequency over a specific time period. Then, group-based communication server 106 may generate one or more trending group-based communication channels and include it in the renderable missed object. In one embodiment, the trending group-based communication channels will include the top 3, 5, 7, etc., group-based communication channels with the highest group-based communication channel member discussion frequency. Considering this information, group-based communication server 106 may automatically rank higher unread message communications coming from a higher trending group-based communication channel, because a trending group-based communication channel may contain more interesting or important information.

The above trending based scoring criteria may be combined with any others discussed herein to determine a missed message communication score. In one embodiment, the group-based communication channel access count and the group-based communication channel member discussion frequency are only used to determine the missed message communication score (as opposed to other scores described above.)

At step 708, group-based communication server 106 determines a display order for one or more unread message communications based on their corresponding missed message communication score. Group-based communication server 106 may organize each unread message communication into a list with the highest scoring unread message communication being arranged first and the lowest scoring unread message communication being arranged last. In some embodiments, group-based communication server 106 may only consider unread message communications that have exceeded a particular threshold score for inclusion in the renderable missed object.

At step 710, group-based communication server 106 generates a renderable missed object based on the determined display orders for the one or more unread message communications in the unread message communication set. In an embodiment, the renderable missed object also includes one or more trending group-based communication channels. In one embodiment, group-based based communication server 106 may determine the display order for the renderable priority object by considering a missed message communication score for each unread message communication. After group-based communication server 106 has determined the display order, the group-based communication server 106 will generate a renderable missed object that is configured to display, when rendered by a client device, a number of relevant (based on score) unread message communications.

In one embodiment, the number of relevant unread direct messages may be no more than 5, 10, 15 etc. In some embodiments, group-based communication server 106 may use a machine learning algorithm or statistical model to improve the display order scoring. Group-based communication server 106 may also use a diversity filter to ensure that group-based communication server 106 retrieves unread message communications from a plurality of group-based communication channels.

In an alternate embodiment, group-based communication server 106 generates a renderable missed object comprising one or more unread direct messages from the unread direct message set and one or more unread message communications from the unread message communication set as described with reference to FIG. 5. In such an embodiment, the renderable missed object may include unread direct messages or unread message communications that were not included in the renderable priority object or that were not displayed to the priority pane. For example, the renderable priority object may contain the top 5 unread direct messages based on an unread direct messaging score, but the renderable missed object may contain the next 5 unread direct messages based on the unread direct messaging score. A similar process may be used for unread message communications or a combination of both unread direct messages and unread message communications.

Client GUI

FIG. 8 represents an exemplary group-based communication interface 800 displayed on a client device. Group-based communication interface 800 includes priority pane 802, last actions pane 806, missed pane 812, user information pane 815, channel list pane 816, and direct messages pane 817. It should be noted that the renderable priority object, the renderable last actions object, and the renderable missed object may all include a plurality of messages, lists, indications, etc. These messages will be ranked according to their corresponding scores. Client device 101C may then determine how many of these messages, lists, indications, etc., to display to the group-based communications interface within each respective pane based on the various display orders.

Priority pane 802 is an interface environment that is configured and displayed as a result of client device 101C rendering the received renderable priority object. Some aspects of priority pane may not be included in the received renderable priority object. For example, client device 101C, without reference to the renderable priority object, may create stylistic nuances to be displayed in the priority pane such as controlling font sizes, color schemes, layout and the like. However, as discussed in detail above, the unread message communication set and unread direct message communication set displayed within priority pane 802 are supplied by the renderable priority object. By relying on the renderable priority object to supply the bulk of the information for rendering the priority pane, client device 101C may require only a "thin" group-based communication system app running on the client device.

The depicted priority pane 802 includes unread message communications 803 and 804, as well as unread direct message 805. Priory pane 802 also includes a "show more" actuator that, when selected, expands the displayed direct messages and/or message communications. In some embodiments, group-based communication interface 800 may display less than the full received number of direct messages and/or message communications. As previously described, the displayed unread direct messages and/or unread message communications may be determined by group-based communication server 106.

Last actions pane 806 is an interface environment that is configured and displayed as a result of client device 101C rendering the received renderable last actions object. Some aspects of the last actions pane may not be included in the received renderable last action object. For example, client device 101C, without referencing the renderable last action object, may create stylistic nuances to be displayed in the last actions pane such as controlling font sizes, color schemes, layout and the like. However, as discussed in detail above, the information displayed within last actions pane 804 is supplied by the renderable last actions object. By relying on the renderable last actions object to supply the bulk of information for rending the last actions pane, client device 101C may require only a "thin" group-based communication system app running on the client device.

As previously described, the renderable last actions object may include one or more sent message communications, one or more incomplete message communications, one or more recently accessed files, and recent group-based communication channel history. The depicted last actions pane 806 includes one incomplete message communication 807, two sent message communications 808A and 808B, three recently accessed files 809A, 809B and 809C, and recent group-based communication channel history 810B. Last actions pane 806 also includes a "show more" actuator that, when selected, expands the displayed incomplete message communications and/or sent message communications. In some embodiments, group-based communication interface 800 may display less than the full received amount of incomplete message communications and/or sent message communications.

As previously described, the displayed incomplete message communication, sent message communications, recently access files and recent group-based communication channel history may be determined by group-based communication server 106. Incomplete message communication 807 also includes actuator 811A labeled "draft." When selected, this actuator will act as a link to the full incomplete message communication 807. Similarly, recent accessed files 809B and 809C, include actuators 811B and 811C, respectively. When selected, these actuators will act as a hyperlink to a memory location of the recently accessed file, so that the file may be viewed and/or downloaded.

Missed pane 812 is an interface environment that is configured and displayed as a result of client device 101C rendering the received renderable missed object. Some aspects of the missed pane may not be included in the received renderable last action object. For example, client device 101C, without reference to the renderable missed object, may create stylistic nuances to be displayed in the missed pane such as controlling font sizes, color schemes, layout and the like. However, as discussed in detail above, the information displayed within missed pane 812 is supplied by the renderable missed object. By relying on the renderable missed object to supply the bulk of information for rendering the missed pane, client device 101C may require only a "thin" group-based communication system app running on the client device.

As previously described, the renderable missed object may include one or more unread message communications and trending group-based communication channels. The depicted missed pane 812 shows trending group-based communication channels 813 and unread message communications 814A and 814B. The displayed trending group-based communication channels and unread message communications may be determined by group-based communication server 106. Trending group-based communication channel 813 also includes actuator 813A (labeled "#design-team"), actuator 813B (labeled "#feat-sli-home"), and actuator 813C (labeled "#sli-leads"). When selected, these actuators will act as a link to their respective group-based communication channels.

User information pane 815 is an interface environment that is configured to display general user information. User information pane 815 contains links to a user's workspace, all threads that the user is a member of, and, in the depicted embodiment, the user's paid time off policy.

Channels list pane 816 is an interface environment that is configured to display group-based communication channels actuators (i.e., links) that correspond to the group-based communication channels a user is a member of. This information may be transmitted to the client device by group-based communication server 106. Group-based communication server 106 may query user profile data to determine one or more associated group-based communication channel identifiers and return to the client device corresponding links to memory locations of the group-based communication channels. Each shown group-based communication channel is an actuator that when selected will act as link to their respective group-based communication channel. In addition, channel list pane 816 will also indicate when there are new unread message communications in each displayed group-based communication channel.

Direct messaging pane 817 is an interface environment that includes direct message actuators that correspond to direct messages associated with a user. This information may be transmitted to the client device by group-based communication server 106. Group-based communication server may query MMC database 404 to determine one or more direct messages associated with a user's global identifier and return to the client device corresponding links to memory locations of the direct messages. Each shown name is an actuator that when selected will act as link to a respective direct message between the user and a recipient associated with the indicated name. In addition, direct messaging pane 817 will also indicate when there are new unread direct messages from corresponding users.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method of generating a group-based communication interface that is configured to efficiently arrange an array of message communications within a defined display window, the group-based communication interface defining a priority pane, a last actions pane, and a missed pane, the computer-implemented method comprising:

receiving a renderable priority object, the renderable priority object comprising an unread message communication set related to a viewing user profile, wherein the unread message communication set comprises a first unread message communication associated with a first channel, a second unread message communication associated with a second channel that is different from the first channel, and a third unread message communication associated with a third channel, wherein the first unread message communication and the second unread message communication comprise a mention identifier and the third unread message communication does not include the mention identifier, wherein the mention identifier is located in a body of the first unread message communication and the second unread message communication and relates the first unread message communication and the second unread message communication to the viewing user profile;

determining, based at least in part on the mention identifier, an unread message communication display set from the unread message communication set, wherein the unread message communication display set comprises an aggregated set of messages associated with different channels including the first unread message communication associated with the first channel and the second unread message communication associated with the second channel, and not the third unread message communication; and rendering the unread message communication display set within the priority pane.

2. The computer-implemented method of claim 1, further comprising:

receiving a renderable last actions object, the renderable last actions object comprising a sent message communication set;

determining a second set of display messages to display from the sent message communication set; and rendering a portion of the second set of display messages within the last actions pane.

3. The computer-implemented method of claim 2, wherein the renderable last actions object comprises at least one of a channel history list associated with a plurality of group-based communication channels and an indication of recently accessed files.

4. The computer-implemented method of claim 3, further comprising rendering at least one of a portion of the channel history list and a portion of the indication of recently accessed files within the last actions pane.

5. The computer-implemented method of claim 3, further comprising simultaneously rendering a portion of the channel history list, a portion of the indications of recently accessed files, and a portion of the second set of display messages within the last actions pane.

6. The computer-implemented method of claim 2, further comprising simultaneously rendering the last actions pane and the priority pane.

7. The computer-implemented method of claim 1, further comprising:

receiving a renderable missed object, the renderable missed object comprising a second unread message communication set;

determining a third set of display messages to display from the second unread message communication set; and rendering a portion of the third set of display messages within the missed pane.

8. The computer-implemented method of claim 7, wherein the renderable missed object comprises a trending group-based communication channels list.

9. The computer-implemented method of claim 8 further comprising simultaneously rendering a portion of the second unread message communication set and the trending group-based communication channels list.

10. The computer-implemented method of claim 7 further comprising simultaneously rendering the missed pane and the priority pane.

11. A computer program product comprising a non-transitory computer readable medium having computer program instructions stored therein, the computer program instructions configured to, when executed by a processor, cause the processor to generate a group-based communication interface that is configured to efficiently arrange an array of message communications within a defined display window, the group-based communication interface defining a priority pane, a last actions pane, and a missed pane, the computer program instructions are further configured to, when executed by the processor, cause the processer to:

receive a renderable priority object, the renderable priority object comprising an unread message communication set related to a viewing user profile, wherein the unread message communication set comprises a first unread message communication associated with a first channel, a second unread message communication associated with a second channel that is different from the first channel, and a third unread message communication associated with a third channel, wherein the first unread message communication and the second unread message communication comprise a mention identifier and the third unread message communication does not include the mention identifier, wherein the mention identifier is located in a body of the first unread message communication and the second unread message communication and relates the first unread message communication and the second unread message communication to the viewing user profile;

determine, based at least in part on the mention identifier, an unread message communication display set from the unread message communication set, wherein the unread message communication display set comprises an aggregated set of messages associated with different channels including the first unread message communication associated with the first channel and the second unread message communication associated with the second channel, and not the third unread message communication; and render the unread message communication display set within the priority pane.

12. The computer program product of claim 11, wherein the computer program instructions, when executed by the processor, further cause the processor to:

receive a renderable last actions object, the renderable last actions object comprising a sent message communication set;

determine a second set of display messages to display from the sent message communication set; and render a portion of the second set of display messages within the last actions pane.

13. The computer program product of claim 12, wherein the renderable last actions object comprises at least one of a channel history list associated with a plurality of group-based communication channels and an indication of recently accessed files.

14. The computer program product of claim 13, wherein the computer program instructions, when executed by the processor, further cause the processor to:

render a portion of the channel history list and a portion of the indications of recently accessed files within the last actions pane.

15. The computer program product of claim 13, wherein the computer program instructions, when executed by the processor, further cause the processor to:

simultaneously render a portion of the channel history list, a portion of the indications of recently accessed files, and a portion of the second set of display messages within the last actions pane.

16. The computer program product of claim 12, wherein the computer program instructions, when executed by the processor, further cause the processor to:

simultaneously render the last actions pane and the priority pane.

17. The computer program product of claim 11, wherein the computer program instructions, when executed by the processor, further cause the processor to:

receive a renderable missed object, the renderable missed object comprising a second unread message communication set;

determine a third set of display messages to display from the second unread message communication set; and render a portion the third set of display messages within the missed pane.

18. The computer program product of claim 17, wherein the renderable missed object comprises a trending group-based communication channels list.

19. The computer program product of claim 18, wherein the computer program instructions, when executed by the processor, further cause the processor to:

simultaneously render a portion the second unread message communication set and the trending group-based communication channels list.

20. The computer program product of claim 17, wherein the computer program instructions, when executed by the processor, further cause the processor to:

simultaneously render the missed pane and the priority pane.

21. The method of claim 1, wherein the renderable priority object further comprises a group-based communication channel identifier set, and wherein each one of the unread message communication set is associated with a group-based communication channel identifier of the group-based communication channel identifier set.

22. An apparatus comprising at least one processor and at least one memory, the at least one memory having computer-coded instructions stored thereon, the computer-coded instructions, in execution with the at least one processor, configures the apparatus to generate a group-based communication interface that is configured to efficiently arrange an array of message communications within a defined display window, the group-based communication interface defining a priority pane, a last actions pane, and a missed pane, the computer-coded instructions further configured to, when executed by the at least one processor, configure the apparatus to:

receive a renderable priority object, the renderable priority object comprising an unread message communication set related to a viewing user profile, wherein the unread message communication set comprises a first unread message communication associated with a first channel, a second unread message communication associated with a second channel that is different from the first channel, and a third unread message communication associated with a third channel, wherein the first unread message communication and the second unread message communication comprise a mention identifier and the third unread message communication does not include the mention identifier, wherein the mention identifier is located in a body of the first unread message communication and the second unread message communication and relates the first unread message communication and the second unread message communication to the viewing user profile;

determine, based at least in part on the mention identifier, an unread message communication display set from the unread message communication set, wherein the unread message communication display set comprises an aggregated set of messages associated with different channels including the first unread message communication associated with the first channel and the second unread message communication associated with the second channel, and not the third unread message communication; and render the unread message communication display set within the priority pane.

* * * * *